United States Patent
Jayaraman et al.

(10) Patent No.: US 11,477,102 B2
(45) Date of Patent: Oct. 18, 2022

(54) UPGRADING USER SPACE NETWORKING STACKS WITHOUT DISRUPTIONS TO NETWORK TRAFFIC

(71) Applicant: Citrix Systems, Inc., Fort Lauderdale, FL (US)

(72) Inventors: Saravanan Jayaraman, Bangalore (IN); Mohit Prakash Saxena, Bangalore (IN); Jyotheesh Rao Kurma, Bangalore (IN); Pulkit Gupta, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 73 days.

(21) Appl. No.: 16/984,575

(22) Filed: Aug. 4, 2020

(65) Prior Publication Data
US 2021/0399966 A1  Dec. 23, 2021

(30) Foreign Application Priority Data
Jun. 23, 2020  (IN) .............................. 202041026598

(51) Int. Cl.
| | |
|---|---|
| *H04L 43/0876* | (2022.01) |
| *H04L 49/00* | (2022.01) |
| *H04L 67/143* | (2022.01) |
| *H04L 47/32* | (2022.01) |
| *H04L 45/00* | (2022.01) |
| *H04L 45/586* | (2022.01) |

(Continued)

(52) U.S. Cl.
CPC ........ *H04L 43/0876* (2013.01); *H04L 41/082* (2013.01); *H04L 41/0846* (2013.01); *H04L 41/0876* (2013.01); *H04L 45/563* (2013.01); *H04L 45/586* (2013.01); *H04L 47/32* (2013.01); *H04L 49/3045* (2013.01); *H04L 67/143* (2013.01)

(58) Field of Classification Search
CPC . H04L 45/563; H04L 45/586; H04L 41/0846; H04L 41/082; H04L 43/0876; H04L 47/32; H04L 49/3045; H04L 67/143
See application file for complete search history.

(56) References Cited

U.S. PATENT DOCUMENTS

| | | | |
|---|---|---|---|
| 8,799,422 B1 * | 8/2014 | Qu .......................... | H04L 45/64 709/220 |
| 9,830,143 B2 * | 11/2017 | Chigurapati .......... | H04L 41/082 |

(Continued)

*Primary Examiner* — Nam T Tran
(74) *Attorney, Agent, or Firm* — Foley & Lardner LLP

(57) ABSTRACT

Described embodiments provide systems and methods for upgrading user space networking stacks without disruptions to network traffic. A first packet engine can read connection information of existing connections of a second packet engine written to a shared memory region by the second packet engine. The first packet engine can establish one or more virtual connections according to the connection information of existing connections of the second packet engine. Each of the first packet engine and the second packet engine can receive mirrored traffic data. The first packet engine can receive a first packet and determine that the first packet is associated with a virtual connection corresponding to an existing connection of the second packet engine. The first packet engine can drop the first packet responsive to the determination that the first packet is associated with the virtual connection.

20 Claims, 12 Drawing Sheets

(51) Int. Cl.
*H04L 41/082* (2022.01)
*H04L 41/08* (2022.01)
*H04L 41/084* (2022.01)

(56) References Cited

U.S. PATENT DOCUMENTS

| | | | |
|---|---|---|---|
| 2007/0162565 A1* | 7/2007 | Hanselmann | H04L 45/60 709/219 |
| 2012/0072893 A1* | 3/2012 | Gupta | G06F 9/445 717/168 |
| 2016/0261460 A1* | 9/2016 | Shi | H04L 41/082 |

* cited by examiner

Processing Pre-Upgrade Connections

Processing Post-Upgrade Connections

UPGRADING USER SPACE NETWORKING STACKS WITHOUT DISRUPTIONS TO NETWORK TRAFFIC

CROSS-REFERENCE TO RELATED APPLICATION

The present application claims priority to and the benefit of IN Provisional Patent Application No. 202041026598, titled "UPGRADING USER SPACE NETWORKING STACKS WITHOUT DISRUPTIONS TO NETWORK TRAFFIC", and filed on Jun. 23, 2020, the contents of all of which are hereby incorporated herein by reference in its entirety for all purposes.

FIELD OF THE DISCLOSURE

The present application generally relates to in-service upgrades of a user space networking stack. In particular, this technical solution can employ network traffic mirroring to avoid disruption of network traffic during an in-service upgrade of a user space networking stack.

BACKGROUND

Over time, a user space networking stack may be upgraded to a new version of software. Often, such upgrades cause the user space network stack to reboot after loading the new version of software. Rebooting the networking stack may result in the tearing down of existing connections and a significant downtime of services.

SUMMARY

This Summary is provided to introduce a selection of concepts in a simplified form that are further described below in the Detailed Description. This Summary is not intended to identify key features or essential features, nor is it intended to limit the scope of the claims included herewith.

Implementations of the systems and methods discussed herein provide for improvements to the user space upgrade process that enable a network packet engine of an appliance to upgrade while avoiding connection loss or port overlap issues during the upgrade. The improvements may enable a live migration of network traffic from a network packet engine to an upgraded version of the network packet engine by replicating the same network traffic to both packet engines. A synchronization protocol may be maintained between the packet engines for the transition period of the upgrade to avoid any connection disruptions.

For example, during an upgrade, a shared memory region of an appliance may be created that enables a first version of a network packet engine to share connection information of pre-existing connections (e.g., connections established before the upgrade) with an upgraded version of the network packet engine. The upgraded packet engine may establish virtual connections based on the connection information. The virtual connections may block the upgraded packet engine from establishing new connections at the same port as the pre-existing connections established by the first version of the network packet engine. Consequently, if the upgraded packet engine is allocated the same set of ports on which to establish connections, the upgraded packet engine may refrain from establishing multiple connections on the same port, improving network traffic during the upgrade by avoiding different devices fighting to communicate with the system over the same port.

Furthermore, the systems and methods described herein provide for a seamless handover over of connections from a first version of a network packet engine to an upgraded version of the network packet engine. Once an upgrade has been initiated, the upgraded version of the network packet engine may establish any new connections with other devices. During the upgrade, a kernel of the appliance may mirror any data packets that the kernel receives and provide the mirrored data packets to both the first version of the network packet engine and to the upgraded version of the network packet engine. Each network packet engine may drop any data packets that they receive that are associated with connections established by the other network packet engine and process data packets that are associated with connections established by the respective network packet engine. As time continues, the first version and the upgraded version of the network packet engine may gradually drop connections that were established pre-upgrade and their corresponding virtual connections. The network packet engine may do so until the upgraded version of the network packet engine controls each connection of the appliance with other devices, completing the upgrade from the first version of the network packet engine to the upgraded version. Thus, the system may complete the upgrade without causing a reboot to the system or a loss of any pre-existing connections.

At least one aspect of this technical solution is directed to a method. The method comprising reading, by a first packet engine of a device from a memory region shared with a second packet engine of the device, connection information of existing connections of the second packet engine written to the shared memory region by the second packet engine; establishing, by the first packet engine, one or more virtual connections according to the connection information of existing connections of the second packet engine, each of the first packet engine and the second packet engine receiving mirrored traffic data; and receiving, by the first packet engine, a first packet. The method further comprising determining, by the first packet engine, that the first packet is associated with a virtual connection corresponding to an existing connection of the second packet engine; and dropping, by the first packet engine, the first packet responsive to the determination that the first packet is associated with the virtual connection.

In some embodiments, the method further comprises receiving, by the first packet engine, a second packet; determining, by the first packet engine, that the second packet is associated with a new connection; and processing, by the first packet engine, the second packet responsive to the determination that the second packet is associated with a new connection. In some embodiments, a mirrored copy of the second packet is dropped by the second packet engine responsive to the determination that the second packet is associated with a new connection. In some embodiments, the method further comprises determining, by the first packet engine, that the first packet engine comprises a newer version than the second packet engine; and writing, by the first packet engine, an identification of instantiation of the first packet engine to the memory region shared with the second packet engine of the device, responsive to the determination that the first packet engine comprises a newer version than the second packet engine.

In some embodiments, each of the one or more virtual connections of the first packet engine is allocated a same port as the corresponding connection of the second packet engine. In some embodiments, the method further comprises determining, by the first packet engine, that a connection timer for a first virtual connection corresponding to a first existing connection has expired; and closing, by the first packet engine, the first virtual connection, responsive to the determination that the connection timer for the first virtual connection has expired. In some embodiments, the method further comprises determining, by the first packet engine, that a transfer timer has expired; and closing, by the first packet engine, any remaining virtual connections, responsive to the determination that the transfer timer has expired.

At least one aspect of this technical solution is directed to another method. The method may comprise detecting, by a first packet engine of a device via a memory region shared with a second packet engine of the device, an identification of instantiation of the second packet engine written to the shared memory region by the second packet engine; writing, by the first packet engine to the memory region shared with the second packet engine, connection information of existing connections of the first packet engine, responsive to detection of the identification of instantiation of the second packet engine; receiving, by the first packet engine, a first packet provided to each of the first packet engine and the second packet engine; determining, by the first packet engine, that the first packet is associated with a new connection; and dropping, by the first packet engine, the first packet responsive to the determination that the first packet is associated with the new connection.

In some embodiments, the method further comprises receiving, by the first packet engine, a second packet provided to each of the first packet engine and the second packet engine; determining, by the first packet engine, that the second packet is associated with an existing connection; and processing, by the first packet engine, the second packet responsive to the determination that the second packet is associated with the existing connection. In some embodiments, the second packet is dropped by the second packet engine, responsive to the determination that the second packet is associated with the existing connection. In some embodiments, the method further comprises determining, by the first packet engine, that a connection timer for an existing first connection has expired; and closing, by the first packet engine, the first connection, responsive to the determination that the connection timer for the first connection has expired.

In some embodiments, the method further comprises determining, by the first packet engine, that a transfer timer has expired; and closing, by the first packet engine, any remaining connections, responsive to the determination that the transfer timer has expired. In some embodiments, the method further comprises transmitting, by the first packet engine to a management service, an identification of completion of transfer to the second packet engine.

At least one aspect of this technical is solution is directed to a system. The system may comprise one or more processors executing a first packet engine and a second packet engine, each of the first packet engine and the second packet engine receiving a copy of received network data; and a memory device comprising a memory region shared by the first packet engine and the second packet engine. The first packet engine is configured to take over processing of network data from the second packet engine by reading, from the memory region shared with the second packet engine of the device, connection information of existing connections of the second packet engine written to the shared memory region by the second packet engine, establishing one or more virtual connections according to the connection information of existing connections of the second packet engine, each virtual connection corresponding to an existing connection of the second packet engine, dropping packets of received network data associated with each virtual connection, processing packets of received network data associated with new connections, and closing each virtual connection responsive to expiration of a connection timer or a transfer timer of the first packet engine.

In some embodiments, the second packet engine is configured to write connection information of existing connections to the shared memory region, responsive to identification of instantiation of the first packet engine. In some embodiments, the first packet engine is further configured to write, to the shared memory region, the identification of instantiation of the first packet engine. In some embodiments, the second packet engine is configured to process packets of received network data associated with each existing connection corresponding to a virtual connection; and drop packets of received network data associated with new connections.

In some embodiments, the second packet engine is configured to close each existing connection responsive to expiration of a connection timer or a transfer timer of the second packet engine. In some embodiments, each virtual connection established by the first packet engine has an identical port to a corresponding existing connection of the second packet engine. In some embodiments, the first packet engine is further configured to notify a management service of completion of taking over processing of network data, responsive to closing all of the virtual connections.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes systems and methods for upgrading user space networking stacks without disruptions to network traffic.

A. Network and Computing Environment

Figure 1A:
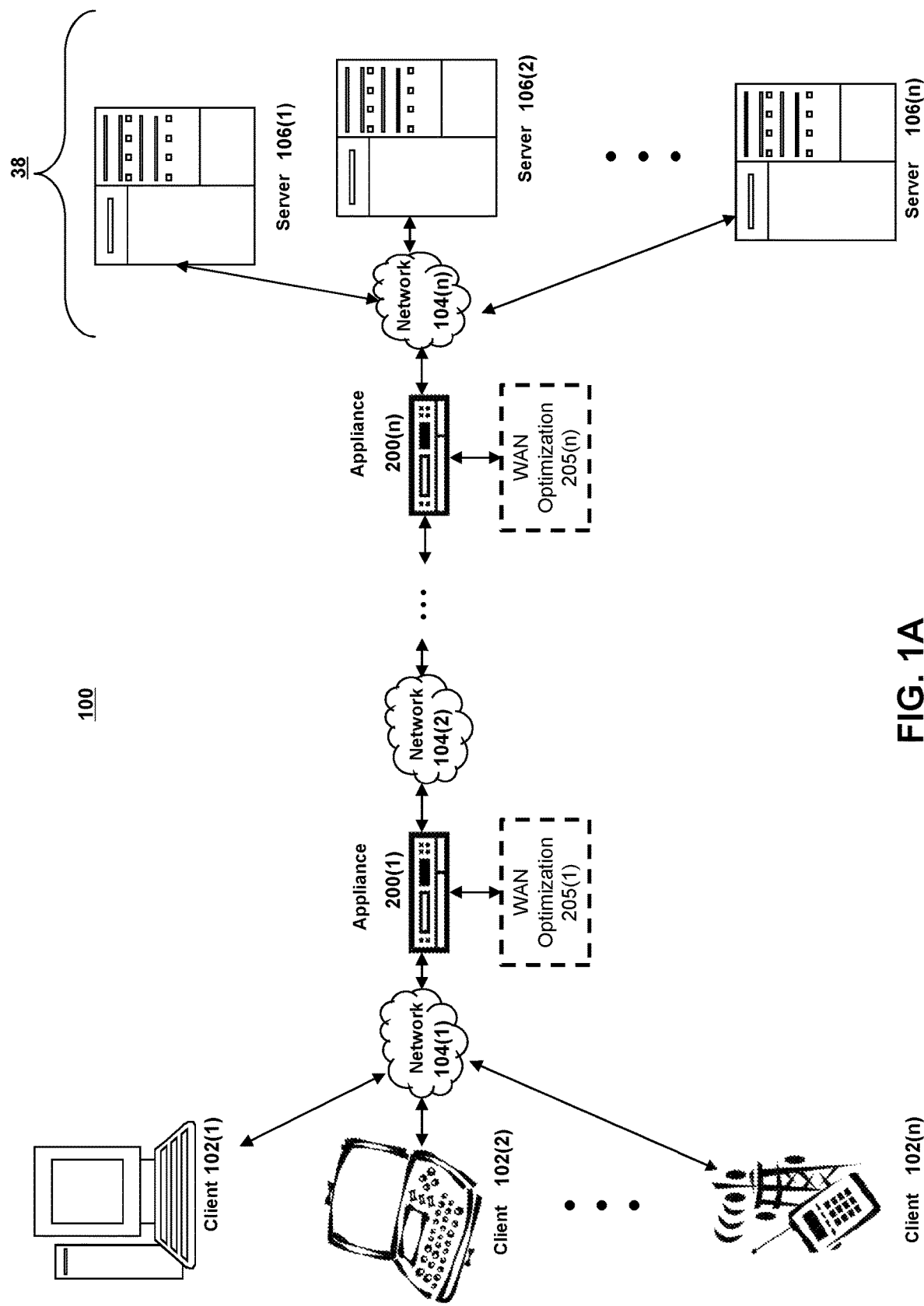
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
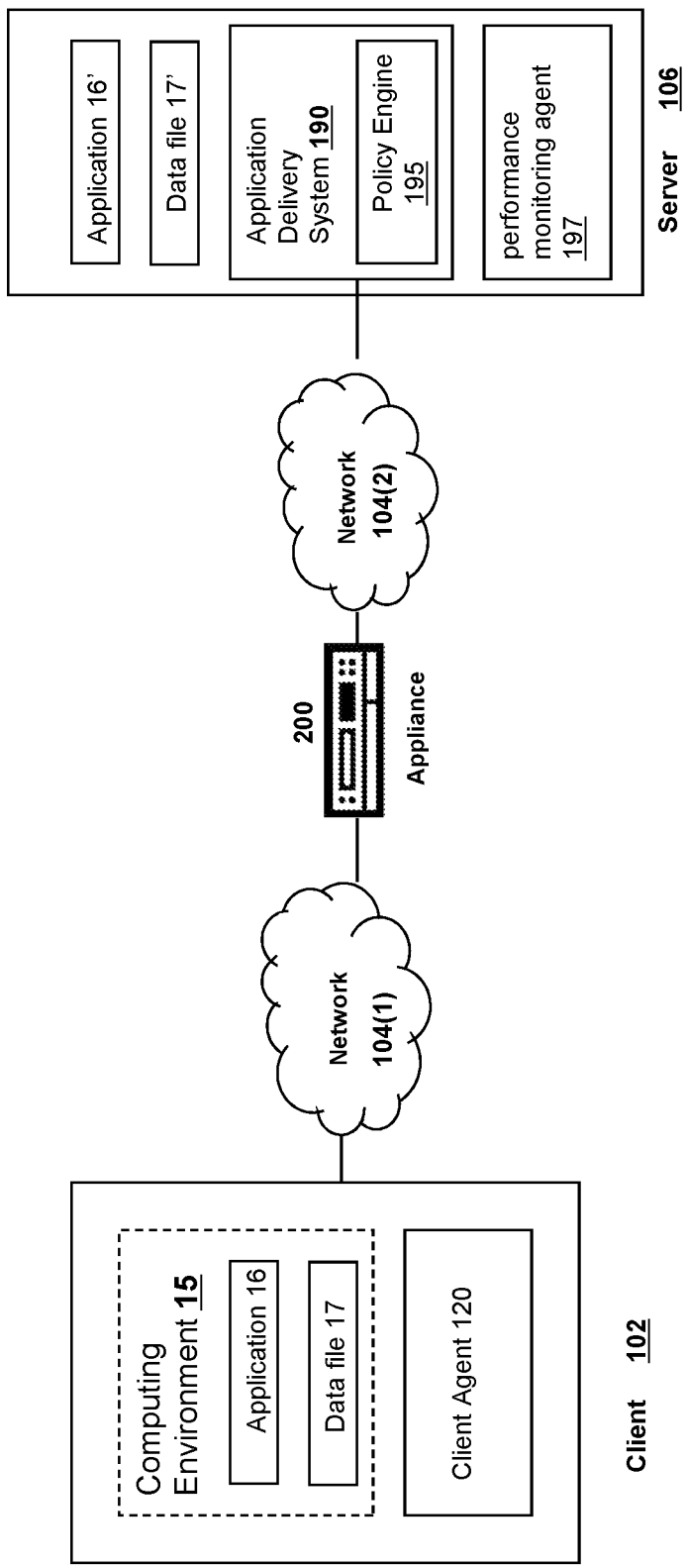
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client agent 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents 120 and 197 may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
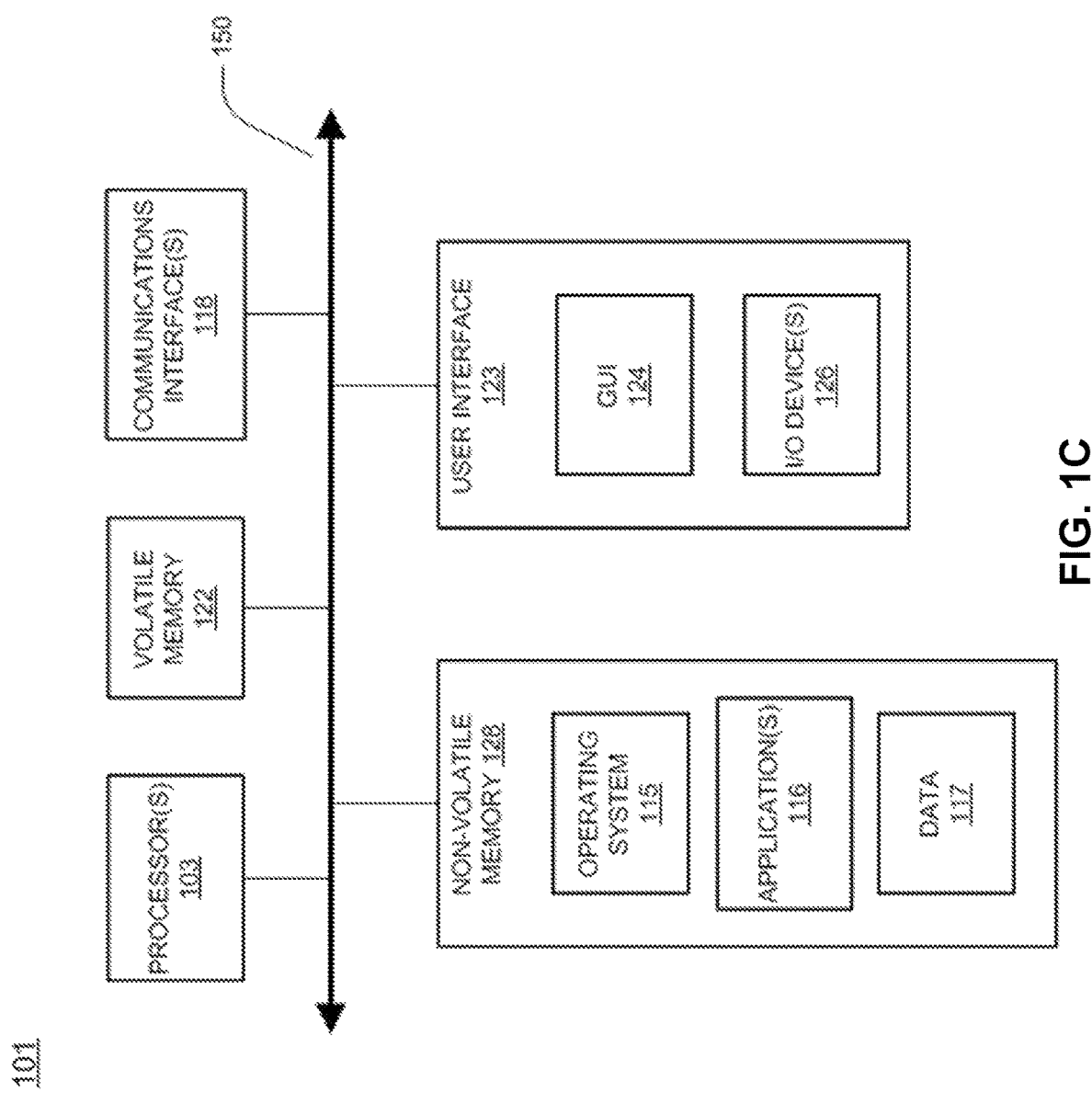
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, computer 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
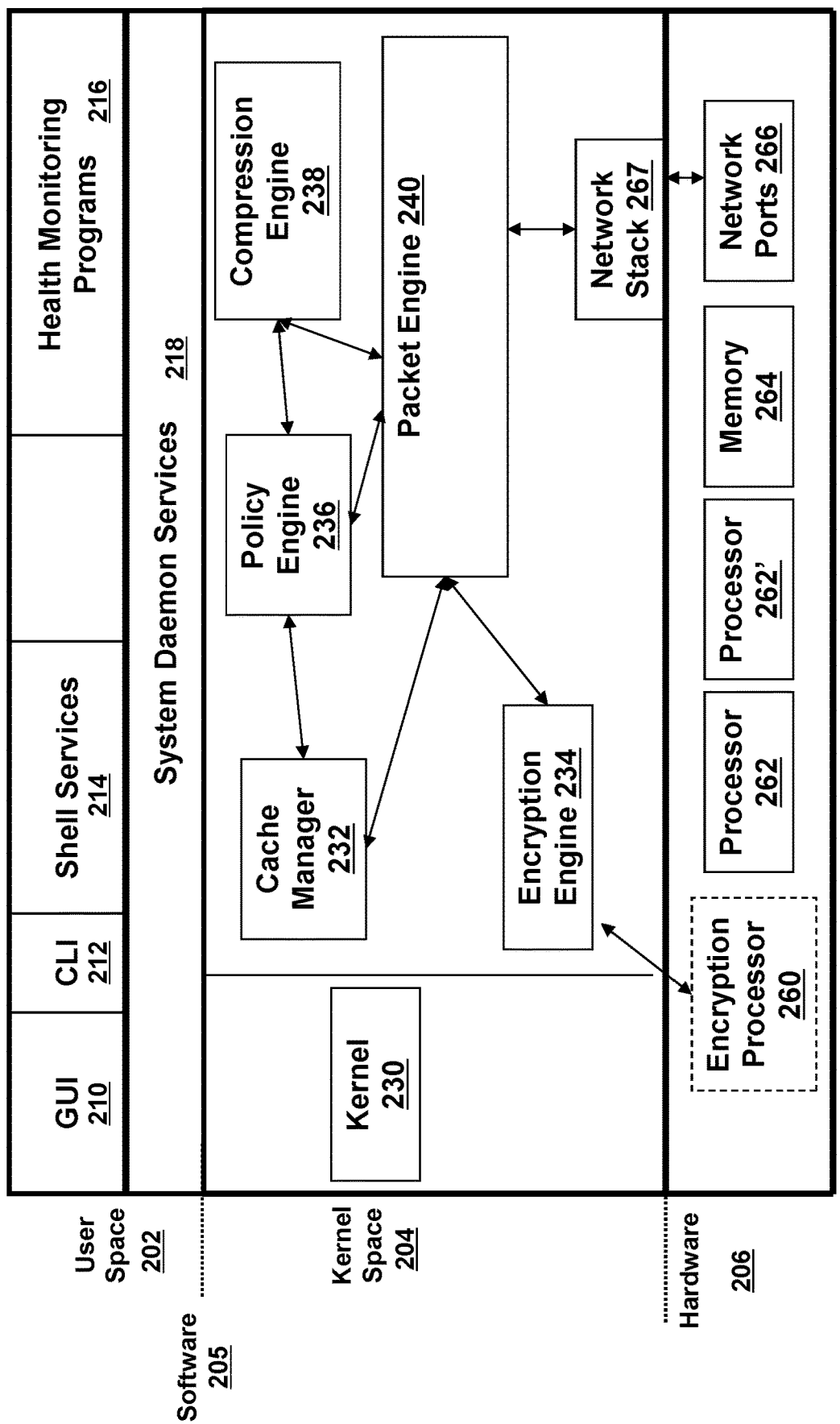
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 16. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task, or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
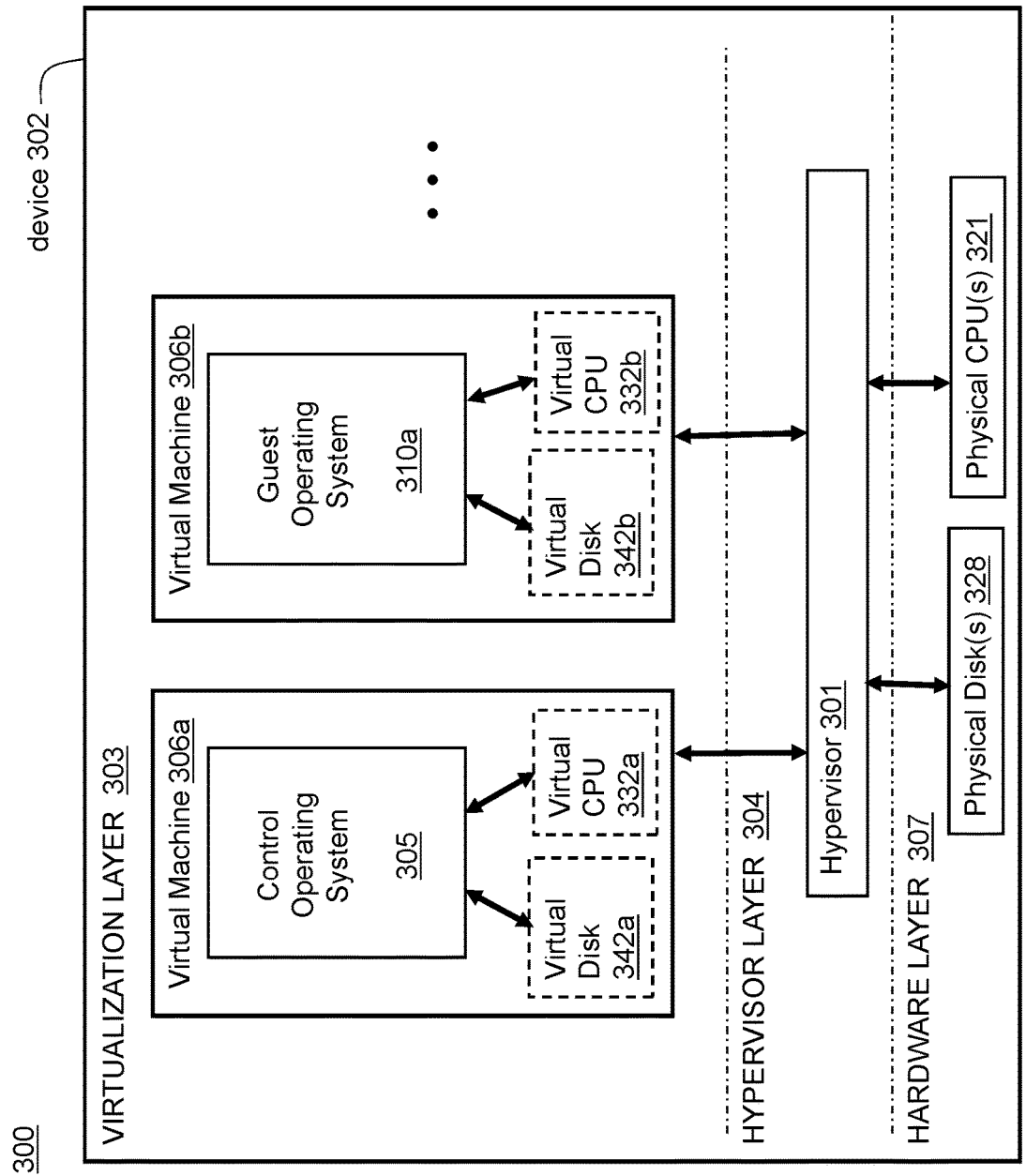
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
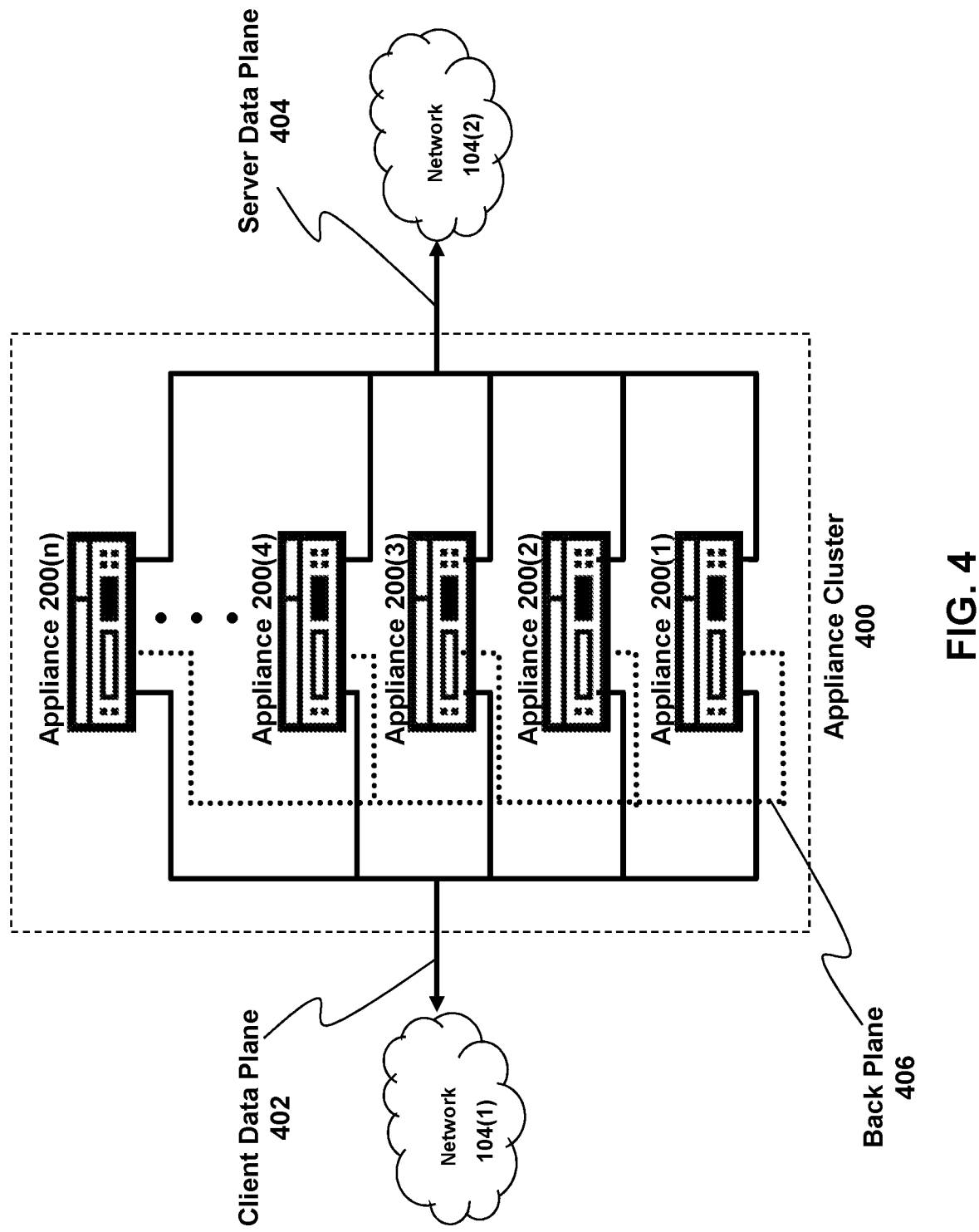
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Upgrading User Space Networking Stacks without Disruptions to Network Traffic Over time, a user space networking stack of an appliance may be upgraded to a new version of software. Often, such upgrades cause the user space network stack to reboot after loading the new version of software. Rebooting the user space network stack may cause any connections that were previously established to be closed or otherwise be removed from memory. Consequently, any devices that attempt to communicate with the appliance may have to establish new connections, causing a lag period as the new connections are established after the upgrade is complete and the user space network stack has been rebooted. Furthermore, during the reboot, new connections may not be established with the appliance. Any devices that attempt to communicate with the appliance may have to wait for the reboot to end and the upgrade to be complete to do so.

Implementations of the systems and methods discussed herein provide for improvements to the user space upgrade process that enable a network packet engine to upgrade while avoiding connection loss and port overlap issues that were caused by the upgrade. The improvements may enable a live migration of network traffic from a network packet engine to an upgraded version of the network packet engine by replicating the same network traffic to both packet engines. A synchronization protocol may be maintained between the packet engines for the transition period of the upgrade to avoid any connection disruptions. Such improvements may enable the network packet engine to upgrade without requiring a reboot of the entire system.

For example, during an upgrade of a network packet engine, a shared memory region may be created that enables a first version of a network packet engine to share connection information with an upgraded version of the network packet engine. Upon detecting an upgrade and an instantiation of the new upgraded version of the network packet engine, the first version of the network packet engine may write its established connection information to the shared memory region. The upgraded packet engine may read the connection information and establish virtual connections based on the connection information. The virtual connections may block the upgraded packet engine from establishing new connections at the same port as pre-existing connections established by the first version of the network packet engine. Consequently, if the upgraded packet engine is allocated the same set of ports to use to establish connections, which may be likely because the upgraded packet engine may be configured to replace the first version of the network packet engine, the upgraded packet engine may refrain from establishing a connection on the same port as a pre-connection established by the first version of the network packet engine. Thus the systems and methods described herein may improve network traffic during the upgrade by avoiding different devices fighting to communicate with the system via the same port.

Furthermore, the systems and methods described herein provide for a seamless handover of connections from a first version of a network packet engine to an upgraded version of the network packet engine. Once an upgrade has been initiated, the upgraded version of the network packet engine may be instantiated. The upgraded version of the network packet engine may become the primary packet engine and establish any new connections between the appliance and other devices. During the upgrade, a kernel of the appliance may mirror any data packets that the kernel receives and provide the mirrored data packets to both the first version of the network packet engine and the upgraded version of the network packet engine. Each network packet engine may drop any data packets that they receive that are associated with connections established by the other network packet engine and process data packets that are associated with connections that are established by the respective network packet engine.

The connections and virtual connections of each packet engine may be associated with an idle timeout timer. The idle timeout timer may indicate the maximum amount of time a connection or virtual connection may be idle (e.g., a time in which no data packets associated with the respective connection have been received or transmitted) before the respective connection or virtual connection is to be deleted. Each of the first version of the network packet engine and the upgraded version of the network packet engine may process their respective data packets and gradually drop connections and/or virtual connections for which a timer has expired. The network packet engines may do so until each of the connections established by the first version of the network packet engine and the virtual connections established by the upgraded network packet engine have been dropped. In some embodiments, the network packet engines may drop such connections upon a transfer timer expiring indicating the upgrade is complete or upon receiving a user input. Consequently, the network packet engines may cooperate to continue processing any data packets that the appliance receives until the upgraded network packet engine controls each connection of the appliance, avoiding disruptions to network traffic processing during the upgrade.

Figure 5A:
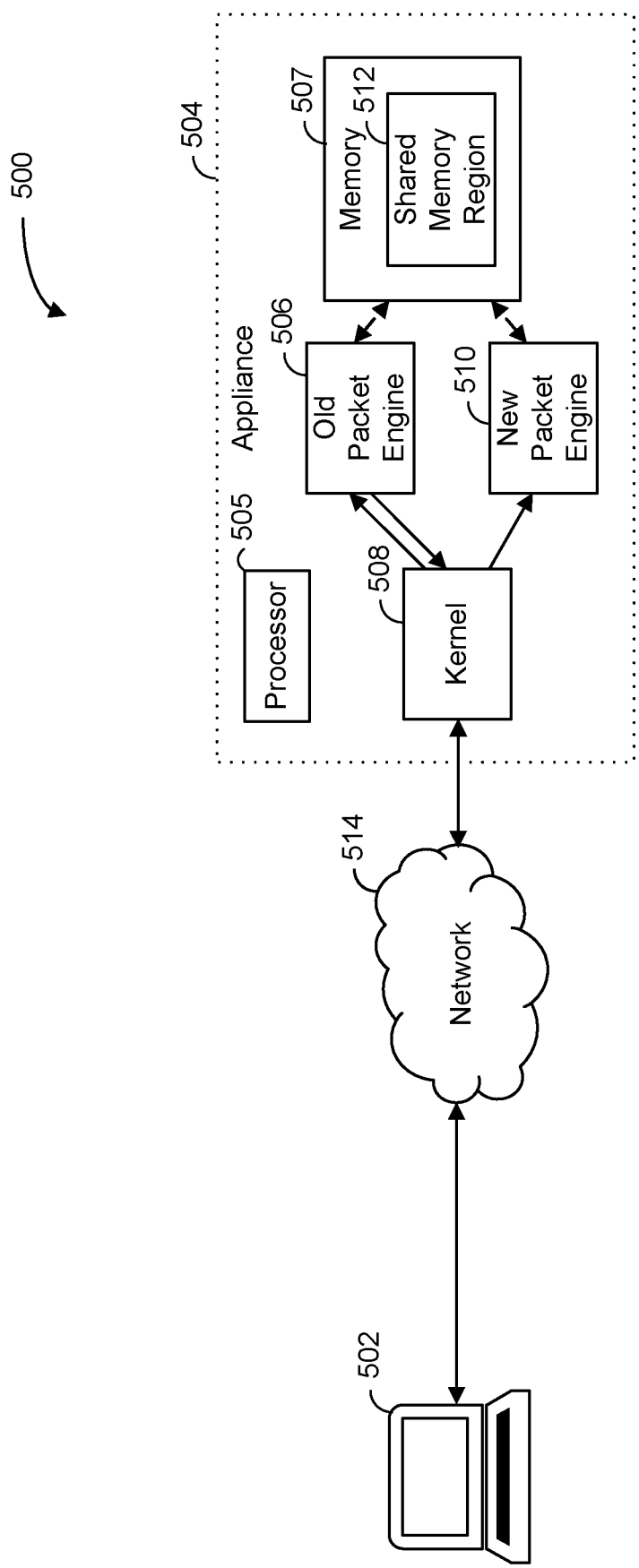
FIG. 5A is a block diagram of a network computing environment for upgrading user space networking stacks without disruptions to network traffic, in accordance with an illustrative embodiment.

For example, referring to FIG. 5A, depicted is a block diagram of a network computing environment 500 for upgrading user space networking stacks without disruptions to network traffic. Network computing environment 500 may include a client device 502. Appliance 504 may have established a connection with client device 502 before initiating an upgrade to an old packet engine 506. Appliance 504 may include a processor 505, old packet engine 506, a memory 507, a kernel 508, and a new packet engine 510. Processor 505 may be an instance of processor 262, memory 507 may be an instance of memory 264, client device 502 may be an instance of client 102, and kernel 508 may be an instance of kernel 230, each of which are previously detailed herein. Client device 502 may communicate with appliance 504 over a network 514. Network 514 may be an instance of network 104, which is previously detailed herein.

Each of the above-mentioned elements or entities is implemented in hardware, or a combination of hardware and software, in one or more embodiments. Each component of client device 502 and/or appliance 504 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the client applications 404). The hardware includes circuitry such as one or more processors in one or more embodiments. Additionally, although shown as a single appliance 504, in many implementations, multiple appliances 504 may be configured as a cluster or farm. Accordingly, in some implementations, a first appliance 504 may include an old packet engine 506 and a second appliance may include a new packet engine 510, and configuration and synchronization may be performed between the two appliances, as discussed in detail below. Similarly, in some implementations, an appliance 504 may be a virtual appliance executed by one or more physical computing devices (e.g. as a cloud of virtual machines). In such implementations, a first virtual machine may include both an old packet engine 506 and a new packet engine 510, or a first virtual machine may include an old packet engine 506 and a second virtual machine may include a new packet engine 510. Accordingly, these systems and methods may allow for seamless handover from one packet engine to another, whether or not the packet engines are deployed on the same physical hardware.

Old packet engine 506 may be configured to generate or create memory segments in memory 507 enabling communication between processes. Upon boot up of appliance 504, processor 505 may instantiate old packet engine 506 (e.g., processor 505 may begin processing old packet engine 506). Old packet engine 506 may manage kernel-level processing of data packets received and transmitted by appliance 504 via the network stack (not shown) of appliance. Appliance 504 may send and/or receive the data packets via ports (not shown) of appliance 504. Old packet engine 506 may write connection information for connections old packet engine 506 has established with other devices. For example, old packet engine 506 may establish a connection with client device 502 using a three-way handshake protocol. Old packet engine 506 may perform the three-way handshake protocol upon receiving a syn packet from the device. Responsive to the three-way handshake protocol being successful, old packet engine 506 may acknowledge the successful connection and designate a port to use for communication with the device. Old packet engine 506 may write connection information (e.g., the IP address of the device, the designated port, the idle timeout period, etc.) for the connection into a memory segment of memory 507, establishing a connection with client device 502.

Appliance 504 may receive an input that causes an upgrade to old packet engine 506. The input may be a user input received via a graphical user interface on a display of appliance 504, an input received upon processing a computer-readable medium, or an input received upon receiving a signal that appliance 504 receives across network 514. In some embodiments, appliance 504 may receive the input after displaying an option to upgrade old packet engine 506 on a user interface of appliance 504. In some embodiments, appliance 504 may display the option responsive to processing a computer-readable medium, such as an optical disk, a floppy disk, or a USB drive, containing upgrade data and identifying instructions that cause appliance 504 to display such an option. In some embodiments, appliance 504 may display the option in response to receiving a signal over network 514 containing similar upgrade data. A user may select the option as an input to initiate the upgrade to old packet engine 506. In some embodiments, processor 505 may automatically update old packet engine 506 upon processing a computer-readable medium or receiving a signal across network 514.

The upgrade data may include a flag or setting that causes processor 505 to update old packet engine to a new version of old packet engine. The upgrade data may further include new code and/or executable instructions on which new packet engine 510 operates. The new code and/or executable instructions may include various bug fixes and/or improvements to old packet engine that enables new packet engine 510 to operate faster and/or experience fewer errors (e.g., transcoding errors, port assignment errors, run-time errors, etc.) than old packet engine.

Responsive to processor 505 receiving a user input or an upgrade signal, processor 505 may instantiate new packet engine 510. Processor 505 may instantiate new packet engine 510 by processing the code and/or executable instructions of the computer-readable medium or from the signal received over network 514. Processor 505 may process old packet engine 506 and new packet engine 510 at the same time. As processor 505 processes old packet engine 506 and new packet engine 510 and, in some cases, during an upgrade, kernel 508 may receive data packets from other devices, make copies or mirror the data packets, and send the copies of the data packets to each of old packet engine 506 and new packet engine 510 for processing.

New packet engine 510 may operate similarly to old packet engine 506. Processor 505 may instantiate new packet engine 510 responsive to receiving a user input or a signal that causes processor 505 to initiate an upgrade to old packet engine 506. As will be described in further detail below, new packet engine 510 may be configured to store session information about new connections between new packet engine 510 and other devices that are established during and after the upgrade to old packet engine 506.

Old packet engine 506 can create or generate a shared memory region 512. Any component of appliance 504 can create or generate shared memory region 512. In some embodiments, shared memory region 512 may be created responsive to processing the executable code for upgrading old packet engine 506. Shared memory region 512 may be a memory region that enables communication between old packet engine 506 and new packet engine 510. Old packet engine 506 and/or new packet engine 510 may be able to read and/or write information into shared memory region 512. Consequently, old packet engine 506 and new packet engine 510 may communicate with each other by writing into shared memory region 512 and reading what the other packet engine wrote.

Old packet engine 506 can determine whether new packet engine 510 has been instantiated. Old packet engine 506 can determine whether new packet engine 510 has been instantiated by monitoring shared memory region 512 for an identification of a new packet engine. The identification may be a flag or setting indicating that an upgraded version of old packet engine 506 has been instantiated. Old packet engine 506 may monitor shared memory region 512 by checking shared memory region 512 at predetermined intervals (e.g., every 1 ms, 5 ms, 10 ms, 100 ms, etc.) or pseudo-randomly for such an identification. In some embodiments, old packet engine 506 may not monitor shared memory region 512 for such an identification. Rather old packet engine 506 may detect when an identification of new packet engine 510 has been written into shared memory region 512 responsive to the identification of new packet engine 510 being written into shared memory region 512. Old packet engine 506 may detect when an identification of the new packet has been written by receiving an indication that shared memory region 512 was updated or that data has been written into shared memory region 512.

New packet engine 510 can write an instantiation identification to shared memory region 512 of old packet engine 506. The instantiation identification may be a flag or setting that indicates an upgrade to old packet engine 506 is taking place or new packet engine 510 has been instantiated. New packet engine 510 may determine whether new packet engine 510 is a newer version of old packet engine 506. New packet engine 510 may make such a determination by identifying a flag or setting in the code of new packet engine 510 identifying new packet engine 510 as a newer version of old packet engine 506. New packet engine 510 may determine it is a newer version of old packet engine 506 while old packet engine 506 operates and serves network traffic for appliance 504.

Responsive to new packet engine 510 determining that new packet engine 510 is a newer version of old packet engine 506, new packet engine 510 may write an instantiation identification to shared memory region 512. By writing the identification of instantiation to shared memory region 512, new packet engine 510 may inform old packet engine 506 that an upgrade is taking place and/or new packet engine 510 has been instantiated. Old packet engine 506 may detect and/or read the instantiation identification. Old packet engine 506 may determine new packet engine 510 has been instantiated by reading the instantiation identification, thus establishing an inter-packet connection between old packet engine 506 and new packet engine 510.

New packet engine 510 may determine whether connection information has been written. The connection information may be connection information for connections that old packet engine 506 established between old packet engine 506 and devices before the upgrade to old packet engine 506. New packet engine 510 may determine whether connection information has been written by monitoring shared memory region 512 for connection information that is written by old packet engine 506. New packet engine 510 may monitor shared memory region 512 similar to how old packet engine 506 monitored shared memory region 512. For example, new packet engine 510 may monitor shared memory region 512 by checking shared memory region 512 at predetermined intervals or pseudo-randomly for new connection information. In some embodiments, new packet engine 510 may not monitor shared memory region 512 for connection information, but rather new packet engine 510 may detect when old packet engine 506 has written connection information into shared memory region 512 responsive to old packet engine 506 writing the connection information into shared memory region 512. New packet engine 510 may detect when old packet engine 506 has written connection information into shared memory region 512 by receiving an indication that shared memory region 512 was updated or data has been written into shared memory region 512.

Old packet engine 506 may write connection information into shared memory region 512 for one or more connections that old packet engine 506 has established. Old packet engine 506 may write such connection information responsive to old packet engine 506 detecting the instantiation identification of new packet engine 510 into shared memory region 512. The connection information for each of the connections may be session information such as the IP address of the device associated with the connection, port information identifying the port that transmits data to and from the respective device, idle timeout configuration data indicating a time period for terminating the session responsive to the device not transferring any data during the time period, etc. Old packet engine 506 may write connection information for each or a portion of the connections for which old packet engine 506 has established connections. For each or a portion of such connections, old packet engine 506 may write enough connection information to enable new packet engine 510 to establish virtual connections with the corresponding devices (e.g., IP address, port number, and/or timeout configuration information). Thus, old packet engine 506 may transfer or share connection information of previously established connections with new packet engine 510.

New packet engine 510 may establish virtual connections. New packet engine 510 may establish one or more virtual connections with other devices using the connection information written into shared memory region 512 by old packet engine 506. New packet engine 510 may read the connection information and write it into a memory region dedicated to connections that are established by new packet engine 510. When writing the connection information into the memory region for new packet engine 510, new packet engine 510 may assign the virtual connections to the same ports as the ports of the corresponding connections between old packet engine 506 and various devices. New packet engine 510 may do so because new packet engine 510 and old packet engine 506 may be allocated the same ports to use to establish connections. New packet engine 510 may be configured to avoid establishing new connections on the same port as a virtual port. Consequently, new packet engine 510 may avoid establishing connection on ports that are occupied by a connection that has been established by old packet engine 506. New packet engine 510 may establish virtual connections until new packet engine 510 writes connection information for all of the pre-existing connections that old packet engine has established.

In some embodiments, old packet engine 506 may send a notification to new packet engine 510 and/or a management service of appliance 504 indicating old packet engine 506 has written, into shared memory region 512, communication information for each connection that old packet engine 506 has previously established. Old packet engine 506 may communicate that the connection information has been transferred to new packet engine 510 through shared memory region 512. In cases in which old packet engine 506 sends the notification to the management service, the management service may send a notification to new packet engine 510 indicating connection information for all of the connections has been written into shared memory region 512. Responsive to receiving the notification, the management service may send a notification to new packet engine 510 to stop monitoring shared memory region 512 or otherwise that the transfer of connection information is complete. Upon receiving the notification from old packet engine 506 or the management service, new packet engine 510 may stop monitoring shared memory region 512 for new connection information.

New packet engine 510 may send a takeover notification to old packet engine 506. New packet engine 510 may determine that new packet engine 510 has established virtual connections for each of the connections that old packet engine 506 has written into memory. New packet engine 510 may do so by identifying the notification that old packet engine 506 or the management service sends to new packet engine 510. In some embodiments, new packet engine 510 may do so by identifying the connection information in shared memory region 512 and determining that new packet engine 510 has established connections based on all of the identified connection information. New packet engine 510 may determine it has established virtual connections for all of the connection information of connections established by old packet engine 506 upon creating a virtual connection for each connection for which old packet engine 506 has shared connection information. Responsive to new packet engine 510 determining that new packet engine 510 has established virtual connections for each connection that old packet engine 506 has written into shared memory region 512, new packet engine 510 may write a notification into shared memory region 512. The notification may be or include a flag or setting indicating to old packet engine 506 that new packet engine 510 has established the virtual connections based on the shared connection information and/or is becoming the active or primary packet engine of appliance 504. Consequently, new packet engine 510, and, in some cases, not old packet engine 506, may establish connections for any new devices that communicate with appliance 504 during and after the upgrade to old packet engine 506.

Old packet engine 506 may determine whether the takeover notification has been received. Old packet engine 506 may do so by monitoring shared memory region 512 similar to how old packet engine 506 monitored shared memory region 512 for the instantiation identification from new packet engine 510. Responsive to receiving the takeover notification from new packet engine 510, old packet engine 506 may stop updating a stat aggregator service indicating a health or any statistical data (e.g., a received data packet count) that old packet engine 506 obtains or determines from processing data packets. New packet engine 510 may update the stat aggregator service instead. Consequently, old packet engine 506 and new packet engine 510 may not send duplicative or conflicting data to the stat aggregator service, ensuring consistency in the data that the stat aggregator service receives.

Both new packet engine 510 and old packet engine 506 may process data packets that they receive from various devices. Kernel 508 may receive data packets from various devices and transmit the data packets to both old packet engine 506 and new packet engine 510. Old packet engine 506 and new packet engine 510 may receive the data packets and determine whether a connection has been established between the respective packet engine and the device. Responsive to a packet engine 506 or 510 determining a connection has been established with the respective packet engine, the packet engine may process the data and transmit it through the port of the connection. However, responsive to a packet engine determining a connection has not been established with the device that sent the data packet, the packet engine may not process the data packet and may instead drop it. Advantageously, by only having one packet engine processing a copied data packet, appliance 504 can avoid having multiple packet engines process and transmit duplicative data to the same device.

For example, kernel 508 of appliance 504 may receive a data packet from client device 502. The data packet may include a header that includes the IP address of client device 502, an IP address of the intended receiver device (e.g., appliance 504), a number of packets of the data packet, an identification number of the particular packet, an identification (e.g., a number) of a protocol used to send the data packet (e.g., Internet Control Messaging Protocol (ICMP), Internet Group Management Protocol (IGMP), Transmission Control Protocol (TCP), and User Datagram Protocol (UDP)), a packet length, a time to live of the packet, and/or synchronization data.

Kernel 508 may distribute the data packet to old packet engine 506 and new packet engine 510. Kernel 508 may mirror the data packet so both old packet engine 506 and new packet engine 510 may receive or read the same data for processing. Depending on the configuration of processor 505, kernel 508 may distribute the data packet to packet engines 506 and 510 in a few manners. In some embodiments, kernel 508 may write the same data of the data packet into the buffers of memory of each of old packet engine 506 and new packet engine 510 for processing. Each packet engine 506 and 510 may read the data from their respective buffer and process the data accordingly. In some embodiments, kernel 508 may write the data of the data packet into a shared buffer of memory 507. Each of old packet engine 506 and new packet engine 510 may read the data from the shared buffer of memory 507 and process the data accordingly. Advantageously, because both old packet engine 506 and new packet engine 510 may read the same data of the data packet, packet engines 506 and 510 may determine whether to drop or process the respective packet based on the same data, avoiding duplicative transmission of data back to client device 502.

Old packet engine 506 may receive the data packet. Old packet engine 506 may receive the data packet by reading the data packet from a buffer of memory specific to old packet engine 506 or by reading the data packet from a shared buffer with new packet engine 510 stored in memory 507. Old packet engine 506 may read the data of the header of the data packet and identify a connection that old packet engine 506 has with client device 502, which sent the data packet.

Old packet engine 506 may determine if the identified connection is a pre-existing connection. A pre-existing connection is a connection that old packet engine 506 established before processor 505 initiated an upgrade to old packet engine 506. Old packet engine 506 may determine if the identified connection is a pre-existing connection by determining if old packet engine 506 has connection information for a connection with the client device 502 stored in memory allocated to old packet engine 506. Old packet engine 506 may make such a determination by searching the memory allocated to old packet engine 506 for the IP address or other identifying information of client device 502 that is in the header of the data packet. In some embodiments, old packet engine 506 may determine the data packet is associated with a pre-existing connection by identifying an identifier of the client device 502 from a list of active sessions that old packet engine 506 has established and maintained with various devices.

Responsive to old packet engine 506 identifying the IP address or other identifying information of client device 502 in its allocated memory, old packet engine 506 may process the data packet. Old packet engine 506 may process the data by reading the data and writing the data into memory 507. In some embodiments, old packet engine 506 may identify the appropriate service or driver of appliance 504 and write the data into the memory associated with the identified service or driver. Old packet engine 506 may identify the port that is associated with client device 502 and/or the connection established between client device 502 and appliance 504 and transmit a data packet back to the client device 502 through the identified port.

New packet engine 510 may receive the same data as old packet engine 506. New packet engine 510 may receive the data by reading the data from a buffer of memory specific to new packet engine 510 or by reading the data from the shared buffer of memory with old packet engine 506. New packet engine 510 may read the data of the header of the data and identify a virtual connection that new packet engine 510 has with client device 502.

New packet engine 510 may determine if appliance 504 has a virtual connection with client device 502. A virtual connection may be a connection that was established by old packet engine 506 before the upgrade to old packet engine 506 was initiated and that new packet engine 510 created upon reading connection information associated with the connection from shared memory region 512. New packet engine 510 may determine if the data is associated with a virtual connection by identifying the connection information that new packet engine 510 wrote into its allocated memory for the connection. For instance, the connection information may include identifying information that indicates that the connection associated with the data packet is a virtual connection that corresponds to a pre-existing connection that was previously established by old packet engine 506. The connection information may identify such connection information and determine the data packet is associated with a pre-existing connection.

Responsive to new packet engine 510 determining the data packet originated at client device 502, for which new packet engine 510 has created a virtual connection, new packet engine 510 may drop the data packet. New packet engine 510 may drop the data packet by deleting the data packet from its respective memory buffer and/or by not processing the data packet any further. Advantageously, by dropping data packets for which new packet engine 510 has a virtual connection, new packet engine 510 may avoid processing the same data as old packet engine 510, preserving memory resources of appliance 504.

Figure 5B:
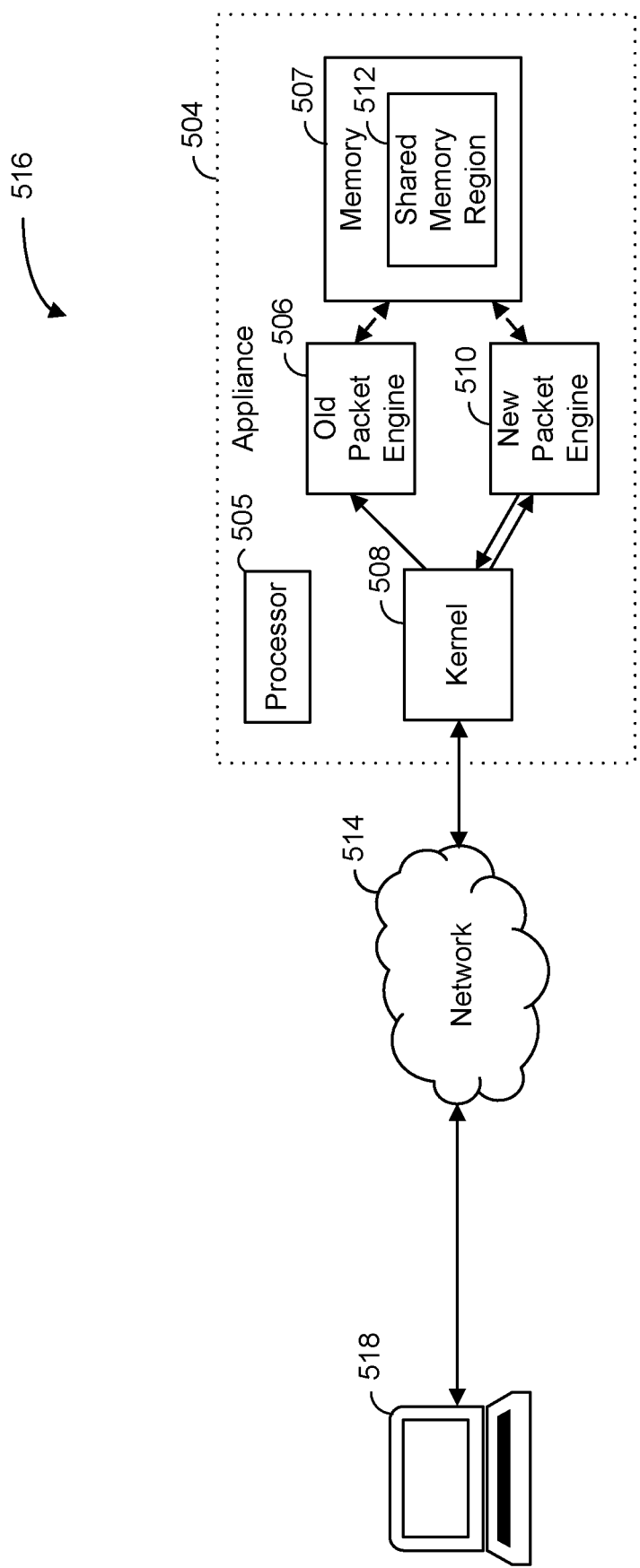
FIG. 5B is a block diagram of another network computing environment for upgrading user space networking stacks without disruptions to network traffic, in accordance with an illustrative embodiment.

FIG. 5B is a block diagram of a network computing environment 516 for upgrading user space networking stacks without disruptions to network traffic. Network computing environment may include a client device 518 in communication with appliance 504 over a network 514. Client device 518 may be an instance of client 102. Client device 518 may have established a connection with appliance 504 during or after an upgrade to old packet engine 506.

Client device 518 may transmit a data packet to appliance 504. Kernel 508 may receive the data packet and mirror it similar to how kernel 508 mirrored the data packet that client device 502 transmitted to appliance 504. Both old packet engine 506 and new packet engine 510 may receive copies of the data packet. Old packet engine 506 may identify data from the header of the data packet and determine the data packet is not associated with a pre-existing connection that old packet engine 506 established. Old packet engine 506 may do so by comparing the connection information to the connection information that old packet engine 506 has stored in memory for pre-existing connections and determining there is no matching connection information. Consequently, old packet engine 506 may drop the data packet.

New packet engine 510 may identify data from the header of the data packet. New packet engine 510 may determine if the data packet is associated with a virtual connection that new packet engine 510 established by comparing the identified data from the header to the corresponding connection information, if any, of a connection between appliance 504 and client device 518 that old packet engine 506 transferred to new packet engine 510. New packet engine 510 may search for a flag or setting in the connection information. Such a flag or setting may indicate the connection is associated with a virtual connection. Responsive to not identifying a flag or setting indicating the connection with client device 518 is a virtual connection, new packet engine 510 may process the data packet (e.g., read the data packet and write it into memory 507, identify a destination of the data packet from the header of the data packet, etc.) and, in some cases, send a data packet back to client device 518 through a port dedicated to the connection between appliance 504 and client device 518.

While processing data packets during and/or after an upgrade to old packet engine 506, one or both of old packet engine 506 and new packet engine 510 may continuously monitor connection and/or transfer timers that indicate whether to close a particular connection or virtual connection. The connection timer may be a timer specific to a particular connection that indicates an amount of time the connection may be idle before old packet engine 506 closes the connection. A connection may be idle during time periods in which the respective device associated with the connection does not transmit or receive any data packets from appliance 504. Old packet engine 506 may maintain the connection timer by incrementing or counting down the timer starting from the most recent time appliance 504 received or transmitted a data packet to the device associated with the connection timer. Old packet engine 506 may determine when the connection timer expires by determining when the count satisfies a threshold or the countdown goes to zero. Old packet engine 506 may make such a determination by comparing the count to the threshold or identifying when the countdown is at zero. Old packet engine 506 may maintain counters for each connection that old packet engine 506 has established with other devices.

Upon determining a connection timer has expired, old packet engine 506 may close the connection associated with the expired connection timer. Old packet engine 506 may close the connection by deleting data associated with the connection from the portion of memory 507 that is allocated to old packet engine 506. Old packet engine 506 may continue to delete stale connections as the connections expire until old packet engine 506 is no longer associated with any connections of appliance 504.

Similarly, new packet engine 510 may maintain virtual connection timers for virtual connections that new packet engine 510 has created. In brief review, new packet engine 510 may create virtual connections to correspond with previously established connections by old packet engine 506. The virtual connections may be associated with the same connection information as the connections that are established by old packet engine 506 (e.g., a virtual connection information may include the same IP address, port number, and idle timeout configuration data as a corresponding connection established by old packet engine 506). Consequently, the virtual connections may have corresponding virtual connection timers to the timers maintained by old packet engine 506. New packet engine 510 may maintain and increment the virtual connection timers in a similar manner to how old packet engine 506 maintains and increments connection timers. Upon determining appliance 504 has not received a data packet from a device associated with a virtual connection timer within a virtual connection time period of a virtual connection timer or the virtual connection timer has otherwise expired, new packet engine 510 may close the virtual connection associated with the expired virtual connection timer. New packet engine 510 may monitor and/or update each virtual connection timer and close the virtual connections associated virtual connection timers that have expired over time. New packet engine 510 may do so until new packet engine 510 closes each virtual connection that new packet engine 510 established. Consequently, old packet engine 506 and new packet engine 510 may gradually close stale connections established before the upgrade to old packet engine 506, opening up available ports for new packet engine 510 to use to establish future connections.

Furthermore, old packet engine 506 and new packet engine 510 may each maintain and/or monitor a transfer timer. The transfer timer may indicate a time for old packet engine 506 to maintain pre-existing connections and a time for new packet engine 510 to maintain virtual connections for the corresponding pre-existing connections. In some embodiments, the transfer timer may correspond to the amount of time the upgrade to old packet engine 506 takes. Old packet engine 506 and new packet engine 510 may update the transfer timer starting from the time the update to old packet engine 506 is initiated. Old packet engine 506 and new packet engine 510 may maintain and increment the transfer timers similar to how they maintain and increment respective connection timers and virtual connection timers. Upon determining the transfer timer has expired, old packet engine 506 may delete the connection information for each pre-existing connection that old packet engine 506 has not deleted. New packet engine 510 may similarly delete connection information for each virtual connection that new packet engine 510 has not yet deleted. Consequently, once the transfer timer expires, new packet engine 510 may have every port available to establish new connections with devices and may process each data packet that appliance 504 receives. In some cases, one or both of old packet engine 506 and new packet engine 510 may send a notification to the management service of appliance 504 indicating the transfer timer has expired. The management service may send a notification to kernel 508 indicating to stop mirroring data packets it receives and, in some cases, to delete or remove old packet engine 506 from memory 507.

In some embodiments, a user may provide an input timeout to appliance 504. The user may provide such an input via a user interface of appliance 504. Upon receiving the input, old packet engine 506 may close each pre-existing connection that it has not yet closed. Old packet engine 506 may write an indication that it is closing the pre-existing connections into shared memory region 512. New packet engine 510 may identify the indication and close the virtual connections that it has established. Thus, new packet engine 510 may be free to assign new connections to all of the ports to which it is allocated without any virtual connections blocking it.

The system and methods described herein may be implemented with any number of packet engines in a multi-packet engine system. For example, a system may have performed multiple upgrades to the same packet engine without removing the original version of the packet engine or the connections it has established from memory. In such a system, the original packet engine may continue to service the connections it has established that is still maintaining and each upgraded version of the original packet engine may service connections they have established while blocking off, via virtual connections, ports of connections that were previously established. The most recent version of the packet engine may be utilized to establish any new connections. In another example, multiple packet engines in a multi-packet engine system may be allocated overlapping ports. Each packet engine may avoid assigning connections to the same overlapping port by informing the other packet via a shared memory region that a connection has been established on an overlapping port. Each other packet engine that was allocated the overlapping port may identify the writing in the shared memory region and create a corresponding virtual connection for the shared port to avoid creating a new connection on the same port as another packet engine.

Figure 6A:
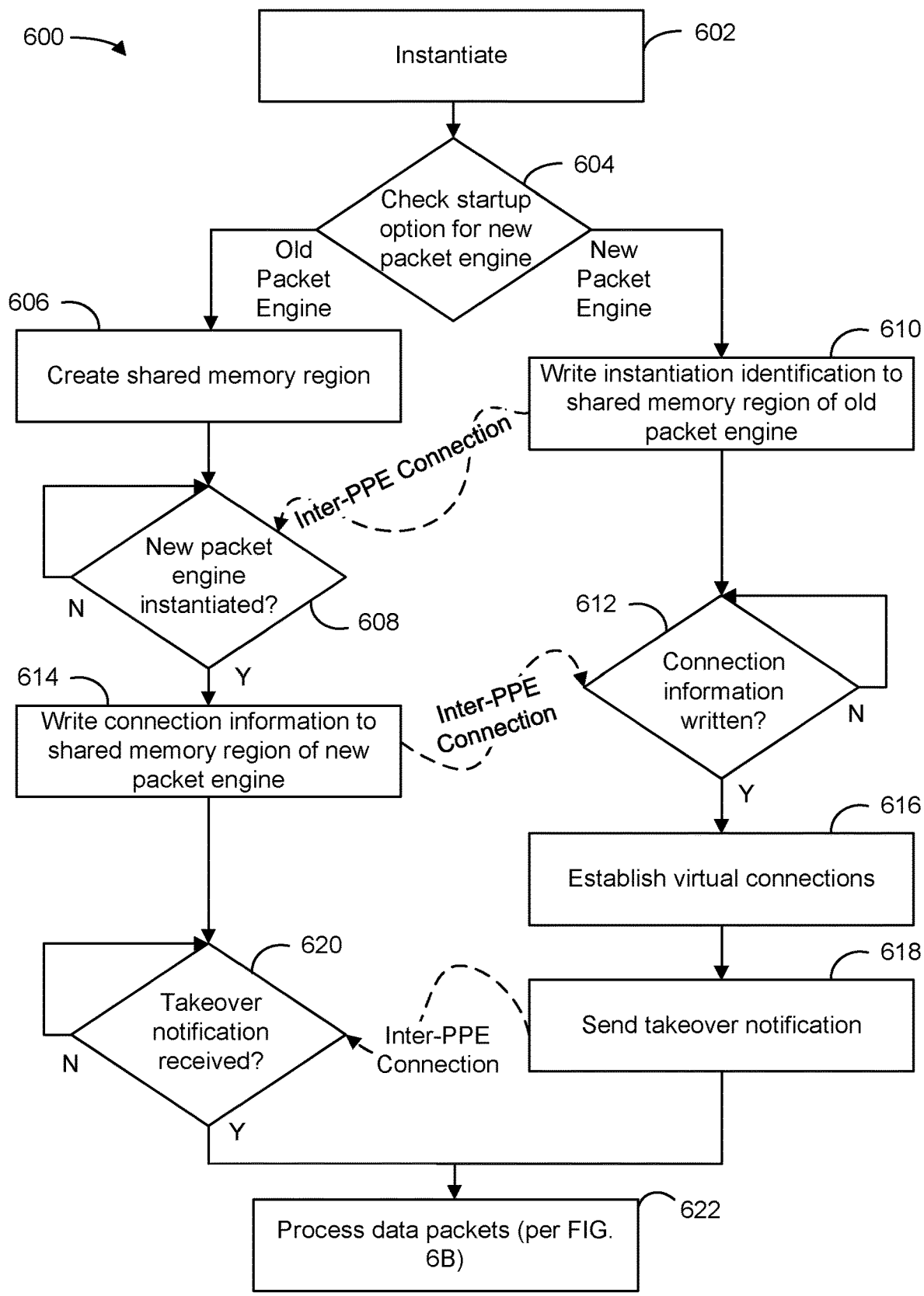
FIG. 6A is a flow diagram for a migration of network traffic from an old packet engine to a new packet engine, in accordance with an illustrative embodiment.

FIG. 6A is a flow diagram of a method 600 for upgrading user space networking stacks without disruptions to network traffic. The functionalities of method 600 may be implemented using, or performed by, the components detailed herein in connection with FIGS. 1-5B. In brief overview, an old packet engine and a new packet can be instantiated on a processor of an appliance (602). The processor can check startup option for a new packet engine (604). The old packet engine can create a shared memory region (606). The old packet engine can determine if a new packet engine has been instantiated (608). The new packet engine can write an instantiation identification to the shared memory region of old packet engine (610). The new packet engine can determine if connection information has been written (612). The old packet engine can write configuration information to a shared memory region of the new packet engine (614). The new packet engine can establish virtual connections (616). The old packet engine can determine whether a takeover notification has been received (618). The new packet engine can send a takeover notification (620). The old packet engine and the new packet engine can process data packets (622).

Referring now to operation 602, and in some embodiments, an appliance can instantiate an old packet engine and a new packet engine. The appliance may instantiate (e.g., begin processing via a processor) the old packet engine upon boot-up. The old packet engine may store, in memory segments of the memory of the appliance, session information about connections the old packet engine established with other devices before an upgrade to the old packet engine. For a session, the session information may include an IP address of the device associated with the session, port information identifying the port that transfers data, idle timeout configuration data indicating a time period for terminating the session responsive to no data being transferred during the time period, etc. The old packet engine may allocate the ports for each connection to avoid network traffic build-up at any particular port. The old packet engine may be configured to receive data packets from a kernel of the appliance, process the data packets by identifying the ports to assign the data packets, and transmit the data packets to the assigned ports via a network stack of the appliance.

The new packet engine may operate similarly to the old packet engine. The processor may instantiate the new packet engine responsive to receiving a user input or a signal that causes the processor to initiate an upgrade to the old packet engine. As will be described in further detail below, the new packet engine may be configured to store session information about new connections between the new packet engine and other devices that are established during and after the upgrade to the old packet engine.

Referring now to operation 604, and in some embodiments, the processor of the appliance can check a startup option for a new packet engine (e.g. a—update or—new flag or startup option, or similar indicator). The processor can display an option on a user interface that causes, upon selection, an update to the old packet engine. In some embodiments, the processor may display the option responsive to processing a computer-readable medium, such as an optical disk, a floppy disk, or a USB drive, and identifying instructions that cause the processor to display such an option. In some embodiments, the processor may automatically update the old packet engine upon receiving a signal over a network containing upgrade data. The upgrade data may include a flag or setting that causes the processor to update the old packet engine to a new version of the old packet engine. The upgrade data may further include new code and/or executable instructions on which the new packet engine operates. The new code and/or executable instructions may include various bug fixes and/or improvements to the old packet engine that enables the new packet engine to operate faster and/or with fewer errors (e.g., transcoding errors, port assignment errors, run-time errors, etc.) than the old packet engine.

Responsive to the processor receiving a user input or an upgrade signal, the processor may instantiate the new packet engine. The processor may instantiate the new packet engine by processing the code and/or executable instructions of the computer-readable medium or from the signal received over the network. The processor may process the new packet engine and the old packet engine at the same time. As the processor processes the new packet engine and the old packet engine during an upgrade, a kernel of the appliance may receive data packets from other devices, make copies or mirror the data packets, and send the copies of the data packets to each of the old packet engine and the new packet engine for processing.

Referring now to operation 606, and in some embodiments, the old packet engine can create or generate a shared memory region. Any component of the appliance can create or generate the shared memory region. In some embodiments, the shared memory region may be created responsive to processing the executable code for upgrading the old packet engine. The shared memory region may be a memory region that enables communication between the old packet engine and the new packet engine. The old packet engine and/or the new packet engine may be able to read and/or write information into the shared memory region. Consequently, the old packet engine and the new packet engine may communicate with each other by writing into the shared memory region and reading what the other packet engine wrote.

Referring now to operation 608, and in some embodiments, the old packet engine can determine whether the new packet engine has been instantiated. The old packet engine can determine whether the new packet engine has been instantiated by monitoring the shared memory region for an identification of a new packet engine. The identification may be a flag or setting indicating that an upgraded version of the old packet engine has been instantiated. The old packet engine may monitor the shared memory region by checking the shared memory region at predetermined intervals or pseudo-randomly for such an identification. In some embodiments, the old packet engine may not monitor the shared memory for such an identification. Rather the old packet engine may detect when an identification of the new packet engine has been written into the shared memory region responsive to the identification of the new packet engine being written into the shared memory region. The old packet engine may detect when an identification of the new packet has been written by receiving an indication that the shared memory region was updated or that data has been written into the shared memory region.

Referring now to operation 610, and in some embodiments, the new packet engine can write an instantiation identification to the shared memory region of the old packet engine. The new packet engine may write the instantiation identification responsive to determining it is an updated version of the old packet engine. To do so, the new packet engine may identify a flag or setting in the code of the new packet engine or of the instructions that initiated the upgrade that identifies the new packet engine as a newer version of the old packet engine. The new packet engine may determine it is a newer version of the old packet engine while the old packet engine operates and serves network traffic for the appliance.

Responsive to the new packet engine determining that the new packet engine is a newer version of the old packet engine, the new packet engine may write an instantiation identification of the new packet engine to the shared memory region. By writing the instantiation identification to the shared memory region, the new packet engine may inform the old packet engine that an upgrade is taking place and/or the new packet engine has been instantiated. The old packet engine may detect and/or read the instantiation identification. The old packet engine may determine the new packet engine has been instantiated by reading the instantiation identification, thus establishing an inter-packet connection between the old packet engine and the new packet engine.

Referring now to operation 612, and in some embodiments, the new packet engine may determine whether connection information has been written. The connection information may be connection information for connections that the old packet engine established between the old packet engine and devices before the upgrade to the old packet engine. The new packet engine may determine whether connection information has been written by monitoring the shared memory region for connection information that is written by the old packet engine. The new packet engine may monitor the shared memory region by checking the shared memory region at predetermined intervals or pseudo-randomly for new connection information. In some embodiments, the new packet engine may not monitor the shared memory region for connection information. Rather the new packet engine may detect when the old packet engine has written connection information into the shared memory region responsive to the old packet engine writing the connection information into the shared memory region. The new packet engine may detect when the old packet engine has written connection information into the shared memory region by receiving an indication that the shared memory region was updated or that data has been written on the shared memory region.

Referring now to operation 614, and in some embodiments, the old packet engine may write connection information for one or more connections that the old packet engine has established. The old packet engine may write the connection information into the shared memory region. The old packet engine may write such connection information into the shared memory region at operation 608 responsive to the old packet engine detecting the instantiation identification of the new packet engine. The old packet engine may write connection information for each or a portion of the connections for which the old packet engine has established connections. For each or a portion of such connections, the old packet engine may write enough connection information to enable the new packet engine to establish virtual connections with the corresponding devices. Thus, the old packet engine may transfer or share connection information of previously established connections with the new packet engine.

Referring now to operation 616, and in some embodiments, the new packet engine may establish virtual connections. The new packet engine may establish one or more virtual connections with other devices using the connection information. To do so, the new packet engine may read the connection information written by the old packet engine from the shared memory region. The new packet engine may then write connection information into a memory region for the new packet engine. When writing the connection information into the memory region for the new packet engine, the new packet engine may assign the virtual connections to the same ports as the ports of the corresponding connections between the old packet engine and the devices. The new packet engine may do so because the new packet engine and the old packet engine may be allocated the same ports to use to establish connections. The new packet engine may be configured to avoid using the same ports as virtual connections when establishing new connections.

Referring now to operation 618, and in some embodiments, the new packet engine may send a takeover notification to the old packet engine. The new packet engine may determine that the new packet engine has established virtual connections for each of the connections that the old packet engine has written into the shared memory region. The new packet engine may do so by identifying the connection information in the shared memory region and determining that the new packet engine has established based on all of the identified connection information. In some embodiments, the old packet engine may transmit an identification of a completion of transfer to the new packet engine. The identification may indicate that connection information for all of the existing connections that the old packet engine is maintaining has been shared with the new packet engine. The new packet engine may identify the identification and determine all of the connection has been shared by the old packet engine. The new packet engine may determine it has established virtual connections for all of the shared connection information upon creating a virtual connection for each connection for which the old packet engine has shared data.

Responsive to the new packet engine determining that the new packet engine has established virtual connections for each connection that the old packet engine has written into memory, the new packet engine may write a notification into the shared memory region. The notification may be or include a flag or setting indicating that the old packet engine has successfully transferred connection information for its connections to the new packet engine. In some embodiments, the flag or setting may indicate to the old packet engine that the new packet engine is becoming the active or primary packet engine of the appliance. Consequently, the new packet engine, and, in some cases, not the old packet engine, may establish connections for any new devices that communicate with the appliance.

Referring now to operation 620, and in some embodiments, the old packet engine may determine whether the takeover notification has been received. The old packet engine may monitor the shared memory region similar to how the old packet engine monitored the shared memory region for the instantiation identification from the new packet engine. Responsive to receiving the takeover notification from the new packet engine, the old packet engine may stop updating a stat aggregator indicating a health or any statistical data (e.g., a received data packet count) that the old packet obtains or determines from processing data packets.

Referring now to operation 622, and in some embodiments, both the new packet engine and the old packet engine may process data packets that they receive from various devices. As will be described in greater detail in FIG. 6B, the kernel receives data packets from various devices and transmits the data packets to both the old and the new packet engines. The old and the new packet engines may receive the data packets and determine whether a connection has been established between the respective packet engine and the device. Responsive to a packet engine determining a connection has been established with the packet engine, the respective packet engine may process the data packet and transmit it through the port of the connection. However, responsive to a packet engine determining a connection has not been established with the device that sent the data packet, the packet engine may not process the data packet and may instead drop it. Advantageously, the appliance can avoid having multiple packet engines processing and transmitting the same data to various devices.

Figure 6B:
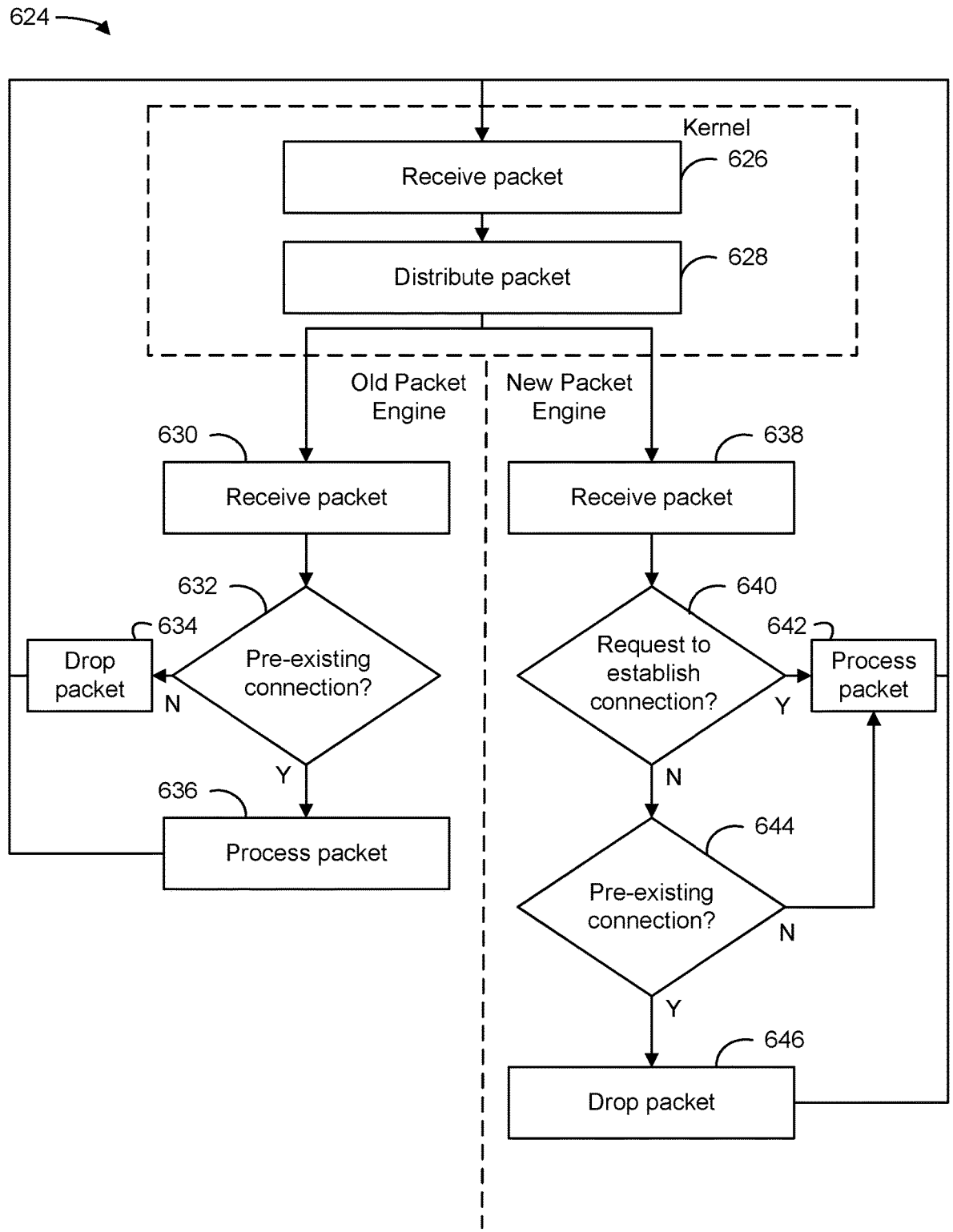
FIG. 6B is a flow diagram for an old packet engine and a new packet engine processing data packets, in accordance with an illustrative embodiment.

FIG. 6B is a flow diagram of an old packet engine and a new packet engine processing data packets, in accordance with an illustrative embodiment. The functionalities of method 624 may be implemented using, or may be performed by, the components detailed herein in connection with FIGS. 1-5B. Method 624 may be performed after the operations of method 600. In some embodiments, method 624 may be performed during an upgrade to an old packet engine. In brief overview, a kernel of an appliance may receive a data packet (626). The kernel may distribute the data packet (628). The old packet engine may receive the data packet (630). The old packet engine may determine if the data packet was sent from a device with a pre-existing connection (632). The old packet engine may drop the data packet (634). The old packet engine may process the data packet (636). The new packet engine may receive the data packet (638). The new packet engine may determine if the data packet is a request to establish a connection (640). The new packet engine may process the data packet (642). The new packet engine may determine if the data packet was sent by a device with a pre-existing connection (644). The new packet engine may drop the data packet (646).

Referring now to operation 626, and in some embodiments, a kernel of an appliance may receive a data packet. The kernel may receive the data packet from an external device across a network. The data packet may include a header that includes the IP address of the external device, an IP address of the intended receiver device, a number of packets of the data packet, an identification number of the particular packet, an identification (e.g., a number) of a protocol used to send the data packet (e.g., ICMP, IGMP, TCP, and UDP), a packet length, a time to live of the packet, and/or synchronization data. The data packet may be a syn packet that is transmitted to establish a connection between the sending device and the appliance via a three-way handshake protocol. In some cases, the data packet may be a data packet that the device transmits after such a connection has already been established.

Referring now to operation 628, and in some embodiments, the kernel may distribute the data packet to the old packet engine and the new packet engine. The kernel may mirror the data packet so both the old packet engine and the new packet engine may receive or read the same data packet for processing. Depending on the configuration of the processor, the kernel may distribute the data packet to both packet engines in different ways. In some embodiments, the kernel may write the same data of the data packet into the buffers of memory of each of the old packet engine and the new packet engine for processing. Each packet engine may read the data from their respective buffer and process the data accordingly. In some embodiments, the kernel may write the data of the data packet into a shared buffer of memory. Each of the old packet engine and the new packet engine may read the data from the shared buffer of memory and process the data accordingly. Advantageously, because both the old packet engine and the new packet engine may read the same data of the data packet, the packet engines may determine whether to drop or process the respective packet based on the same data, avoiding repetitive transmission of data back to the device that sent the data packet.

Referring now to operation 630, and in some embodiments, the old packet engine may receive a data packet. The old packet engine may receive the data packet by reading the data packet from a buffer of memory specific to the old packet engine or by reading the data packet from a shared buffer with the new packet engine. The old packet engine may read the data of the header of the data packet and identify a connection, if any, that the old packet engine has with the device that sent the data packet.

Referring now to operation 632, and in some embodiments, the old packet engine may determine if the identified connection is a pre-existing connection. A pre-existing connection is a connection that the old packet engine established before the processor initiated an upgrade to the old packet engine. The old packet engine may determine if the identified connection is a pre-existing connection by determining if the old packet engine has connection information for a connection with the sending device stored in memory allocated to the old packet engine. The old packet engine may make such a determination by searching the memory allocated to the old packet engine for the sender device IP address or other identifying information that is in the header of the data packet.

Referring now to operation 634, and in some embodiments, responsive to the old packet engine not identifying the IP address or other identifying information of the sender device in its allocated memory, the old packet engine may drop the data packet. In some embodiments, the old packet engine may drop the data packet by identifying the active sessions that the old packet engine has maintained and determining the sending device does not have an active session with the old packet engine. The old packet engine may drop the data packet by deleting the data packet from its respective memory buffer or by not processing the data packet any further. Advantageously, by dropping data packets for which the old packet engine does not have a pre-existing connection, the old packet engine may avoid processing the same data as the new packet engine, preserving memory resources.

Referring now to operation 636, and in some embodiments, responsive to the old packet engine identifying the IP address or other identifying information of the sender device in its allocated memory, the old packet engine may process the data packet. In some embodiments, the old packet engine may determine the data packet is associated with a pre-existing connection by identifying an identifier of the sending device from a list of active sessions that the old packet engine has established and maintained with various devices. The old packet engine may process the data packet by reading the data in the data packet and writing the data into memory. In some embodiments, the old packet engine may identify the appropriate service of the appliance and write the data from the data packet into the memory associated with the identified service. The old packet engine may identify the port that is associated with the sending device and/or the connection established with the sending device and transmit a data packet back to the sending device through the identified port or to a destination device identified by an IP address or other device identifier in the header of the data packet.

Referring now to operation 638, and in some embodiments, the new packet engine may receive the same data as the old packet engine. The new packet engine may receive the data packet by reading the data packet from a buffer of memory specific to the new packet engine or by reading the data packet from the shared buffer with the old packet engine. The new packet engine may read the data of the header of the data packet and identify a connection, if any, that the new packet engine has with the device that sent the data packet.

Referring now to operation 640, and in some embodiments, the new packet engine may determine whether the data packet is or includes a request to establish a connection. The new packet engine may do so by determining if the data packet is a syn packet, as described above. The new packet engine may determine if the data packet is a syn packet by identifying the data and determining if the data includes a request to establish a new connection with the sending device. The new packet engine may determine the data packet is a syn packet if the data includes a request to establish a new connection. Otherwise, the new packet engine may determine the data packet is not a request to establish a new connection.

Referring now to operation 642, and in some embodiments, the new packet engine may process the data packet responsive to the new packet engine determining the data packet is a request to establish a connection. The new packet engine may process the data packet by performing a three-way handshake protocol to establish a connection between the new packet engine and the sending device. Based on such processing, the new packet engine may establish a connection with the sending device by allocating communications with the device to an available port and writing details about the connection into memory allocated to the new packet engine.

Referring now to operation 644, and in some embodiments, responsive to the new packet engine determining the data packet is not a request to establish a new connection, the new packet engine may determine if the appliance has a pre-existing connection with the sending device. A pre-existing connection may be a connection that was established by the old packet engine before the upgrade to the old packet engine was initiated. The new packet engine may determine if the data packet is associated with a pre-existing connection by identifying the connection information that the new packet engine wrote into its allocated memory for the connection. For instance, the connection information may include identifying information that indicates that the connection associated with the data packet is a virtual connection that corresponds to an existing connection that was previously established by the old packet engine. The connection information may identify such connection information and determine the data packet is associated with a pre-existing connection. However, responsive to the data indicating the connection was established by the new packet engine, the new packet engine may determine the data packet is not associated with a pre-existing connection.

Referring now to operation 646, and in some embodiments, responsive to the new packet engine determining the data packet is associated with a pre-existing connection established by the old packet engine, the new packet engine may drop the data packet. The new packet engine may drop the data packet in a similar manner to how the old packet engine drops data packets at operation 634. However, referring again to operation 642, and in some embodiments, responsive to the new packet engine determining the data packet is not associated with a pre-existing connection established by the old packet engine, the new packet engine may process the data packet. The new packet engine may process the data packet similar to how the old packet engine processes data packets at operation 636.

Referring now to operation 646, and in some embodiments, responsive to the new packet engine determining the data packet originated at a device with a pre-existing connection with the appliance, the new packet engine may drop the data packet. The old packet engine may drop the data packet by deleting the data packet from its respective memory buffer or by not processing the data packet any further. Advantageously, by dropping data packets for which the new packet engine does not have a pre-existing connection, the new packet engine may avoid processing the same data as the new packet engine, preserving memory resources.

Figure 7A:
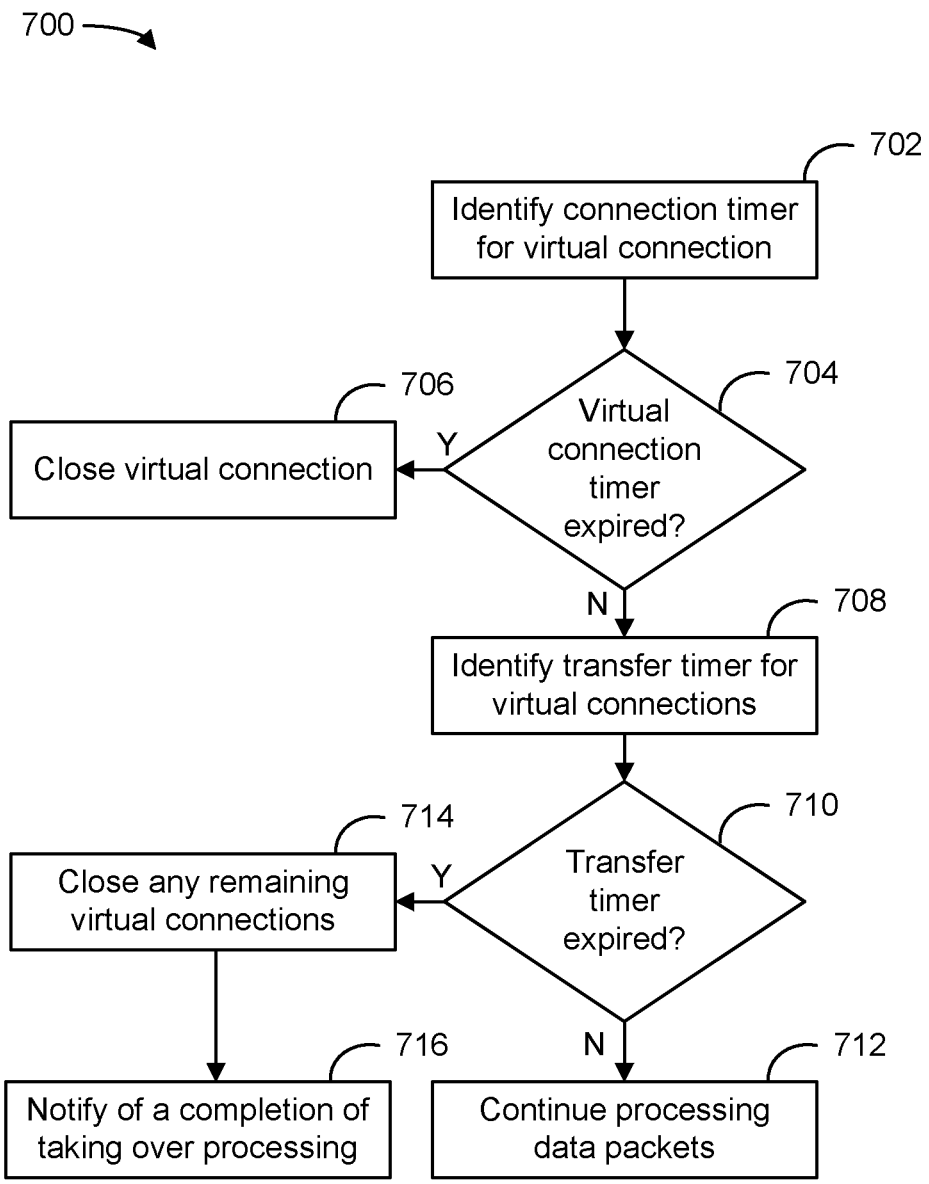
FIG. 7A is a flow diagram for managing virtual connections established during a packet engine upgrade, in accordance with an illustrative embodiment.

FIG. 7A is a flow diagram of a method 700 for managing virtual connections established during a packet engine upgrade. The functionalities of method 700 may be implemented using, or performed by, the components detailed herein in connection with FIGS. 1-5B. In particular, the method 700 may be performed by a new packet engine that is replacing an old packet engine as an upgrade. In brief overview, a new packet engine of a processor of an appliance can identify a connection timer for a virtual connection (702). The new packet engine can determine whether the virtual connection timer has expired (704). The new packet engine can close the virtual connection (706). The new packet engine can identify a transfer timer for virtual connections (708). The new packet engine can determine whether the transfer timer has expired (710). The new packet engine can continue processing data packets (712). The new packet engine can close any remaining virtual connections (714). The new packet engine can notify of a completion of taking over processing (716).

Referring now to operation 702, and in some embodiments, the new packet engine can identify a virtual connection timer for a virtual connection. The virtual connection timer may be an idle timeout timer that identifies a predetermined time period or a time frame. The predetermined time period or time frame may correspond to a maximum amount of time in which the virtual connection may remain idle (e.g., a time in which the new packet engine has not received a data packet corresponding to the virtual connection) before the new packet engine closes the virtual connection. The new packet engine may identify the connection timer from corresponding virtual connection information written into memory.

Referring now to operation 704, and in some embodiments, the new packet engine can determine if the virtual connection timer has expired. The new packet engine may maintain a count of the time that has passed since the last data packet associated with the virtual connection has been received. The count may reset for each data packet that the new packet engine receives that is associated with the virtual connection. The new packet engine may compare the count to a threshold identifying the maximum amount of time that the virtual connection may remain idle before the new packet engine closes the virtual connection. Responsive to the count being less than the threshold, the new packet engine may determine the virtual connection timer has not expired and continue maintaining the virtual connection. Responsive to the count exceeding or otherwise satisfying the threshold, the new packet engine may determine the virtual connection timer has expired and, at operation 706, and in some embodiments, close the virtual connection. Thus, if the device associated with the virtual connection attempts to transmit data to the appliance after the new packet engine closes the virtual connection, the device may have to establish a new connection with the appliance.

Referring now to operation 708, and in some embodiments, the new packet engine can identify a transfer timer for all virtual connections. The transfer timer may be a timer established for all virtual connections that establishes a time that the virtual connections may be maintained or a time before the virtual connections are to be deleted. Similar to the virtual connection timer, the transfer timer may count down to zero (or be incremented up to a threshold) proportional to the continuation of time starting from the time the upgrade to an old packet engine was initiated. The new packet engine can identify and/or maintain a count of the transfer timer from a shared memory region of the appliance to which both the new packet engine and the old packet engine have access. In some embodiments, the transfer timer may be included in the executable instructions that established the new packet engine. The new packet engine may identify and/or maintain the transfer timer from the executable instructions.

Referring now to operation 710, and in some embodiments, the new packet engine can determine if the transfer timer expired. The new packet engine can determine if the transfer timer has expired by determining if the virtual time counted down to zero or if the timer incremented up to a threshold, depending on the configuration of the transfer timer. In some embodiments, instead of a transfer timer, the new packet engine may determine if a user input has been received indicating that the transfer has expired and/or to close the remaining virtual connections. Responsive to the new packet engine determining the transfer timer has not expired, at operation 712, the new packet engine may continue processing data packets as described with reference to FIG. 6B. However, responsive to the new packet engine determining the transfer timer has expired, at operation 714, the new packet engine may close any remaining virtual connections that the new packet engine has established.

Referring now to operation 716, and in some embodiments, responsive to closing all of the virtual connections, the new packet engine may notify a management service of a completion of the new packet engine taking over processing of network data from the old packet engine. By notifying the management service of the takeover completion, the management service may cause the old packet engine to be removed or otherwise be deleted from the software of the appliance.

Figure 7B:
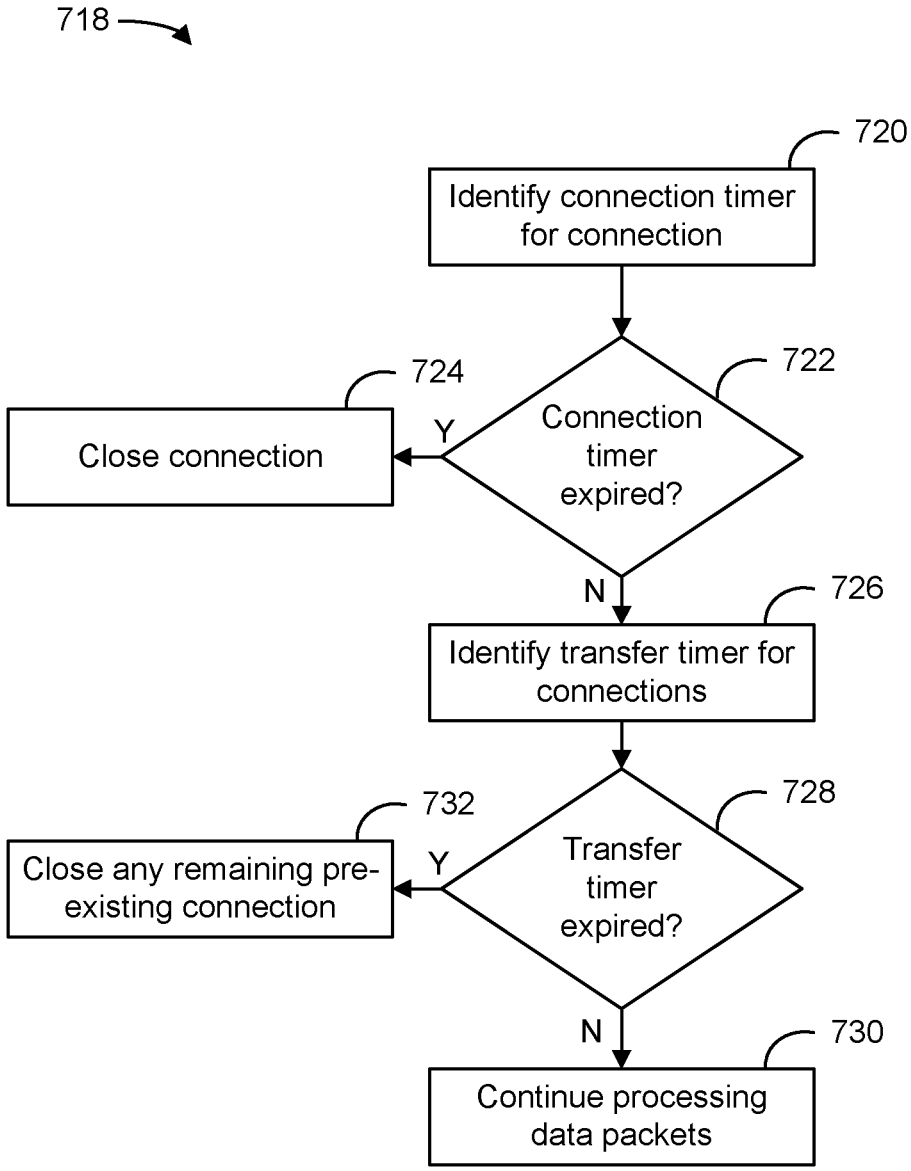
FIG. 7B is a flow diagram for managing pre-existing connections established during a packet engine upgrade, in accordance with an illustrative embodiment.

FIG. 7B is a flow diagram of a method 718 for managing pre-existing connections established during a packet engine upgrade. The functionalities of method 718 may be implemented using, or performed by, the components detailed herein in connection with FIGS. 1-5B. In particular, the method 718 may be performed by an old packet engine during an upgrade of the old packet engine. In brief overview, an old packet engine of a processor of an appliance can identify a connection timer for a connection (720). The old packet engine can determine whether the connection timer has expired (722). The old packet engine can close the connection (724). The old packet engine can identify a transfer timer for connections (726). The old packet engine can determine whether the transfer timer has expired (728). The new packet engine can continue processing data packets (730). The old packet engine can close any remaining pre-existing connections (732).

Referring now to operation 720, and in some embodiments, the old packet engine can identify a connection timer for a connection. The old packet engine may identify the connection timer from connection information that the old packet engine has written into a memory segment. The connection timer may indicate an idle time until the connection times out, causing the old packet engine to close the associated connection out. The connection timer may be and operate similarly to the virtual connection timer described above at operations 702-706. For example, the old packet engine may increment and maintain a counter indicating a time since the appliance last received a data packet associated with the connection. In another example, the old packet engine may count down by seconds to zero starting from a predetermined time (e.g., 30 minutes, 1 hour, two hours, a time of upgrade, etc.).

At operation 722, and in some embodiments, the old packet engine can determine if the connection timer has expired. The old packet engine may determine if the connection timer has expired similar to how the new packet engine determines if the virtual connection timer has expired at operation 704. Responsive to the old packet engine determining the connection timer has not expired, the old packet engine may not close the associated connection. However, at operation 724, and in some embodiments, responsive to the old packet engine determining the connection timer has expired, the old packet engine may close the connection.

In some embodiments, the connection timer may match and be updated similar to a corresponding virtual connection timer that is maintained and/or updated by the new packet engine. The old packet engine may close the connection and the new packet engine may close the corresponding virtual connection responsive to the connection timer and the virtual connection timer expiring, respectively. In some embodiments, the virtual connection timer and the connection timer may expire at the same or substantially the same time. Consequently, the connections associated with the device of the closed connection and the virtual connection may be closed or removed from memory of the appliance. The new packet engine may establish a new connection with the new packet engine when the device attempts to communicate with the appliance again.

At operation 726, and in some embodiments, the old packet engine can identify the transfer timer for connections. The old packet engine may identify the transfer timer for connections similar to how the new packet engine identifies a transfer timer for virtual connections at operation 708. At operation 728, and in some embodiments, the old packet engine can determine if the transfer timer has expired. The old packet engine may make such a determination similar to how the new packet engine determined if the transfer timer expired for virtual connections. At operation 730, and in some embodiments, responsive to the old packet engine determining the transfer timer has not expired, the old packet engine may continue processing data packets according to pre-existing connections that the old packet engine formed with various devices before the update to the old packet engine was initiated. At operation 732, and in some embodiments, responsive to the old packet engine determining the transfer timer expired, the old packet engine may close any remaining pre-existing connections that have not expired. In some embodiments, alternatively or additionally, the old packet engine may close the remaining pre-existing connections responsive to a user input. Consequently, the old packet engine may be removed or deleted from the appliance so the upgraded new packet engine can handle each of the connections between the appliance and other devices without being blocked by connections established by the old packet engine.

Accordingly, the systems and methods described herein provide for a seamless handover over of connections from a first version of a network packet engine to an upgraded version of the network packet engine. Once an upgrade has been initiated, the upgraded version of the network packet engine may be instantiated. The upgraded version of the network packet engine may become the primary packet engine and establish any new connections between the appliance and other devices. During the upgrade, a kernel of the appliance may mirror any data packets that the kernel receives and provide the mirrored data packets to both the first version of the network packet engine and the upgraded version of the network packet engine. Each network packet engine may drop any data packets that they receive that are associated with connections established by the other network packet engine and process data packets that are associated with connections that are established by the respective network packet engine.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method, comprising:
reading, by a first packet engine of a device from a memory region shared with a second packet engine of the device, connection information of existing connections of the second packet engine written to the shared memory region by the second packet engine;
establishing, by the first packet engine, one or more virtual connections according to the connection information of existing connections of the second packet engine, each of the first packet engine and the second packet engine receiving mirrored traffic data;
receiving, by the first packet engine, a first packet;
determining, by the first packet engine, that the first packet is associated with a virtual connection corresponding to an existing connection of the second packet engine; and
dropping, by the first packet engine, the first packet responsive to the determination that the first packet is associated with the virtual connection.

2. The method of claim 1, further comprising:
receiving, by the first packet engine, a second packet;
determining, by the first packet engine, that the second packet is associated with a new connection; and
processing, by the first packet engine, the second packet responsive to the determination that the second packet is associated with a new connection.

3. The method of claim 2, wherein a mirrored copy of the second packet is dropped by the second packet engine responsive to the determination that the second packet is associated with a new connection.

4. The method of claim 1, further comprising:
determining, by the first packet engine, that the first packet engine comprises a newer version than the second packet engine; and
writing, by the first packet engine, an identification of instantiation of the first packet engine to the memory region shared with the second packet engine of the device, responsive to the determination that the first packet engine comprises a newer version than the second packet engine.

5. The method of claim 1, wherein each of the one or more virtual connections of the first packet engine is allocated a same port as the corresponding connection of the second packet engine.

6. The method of claim 1, further comprising:
determining, by the first packet engine, that a connection timer for a first virtual connection corresponding to a first existing connection has expired; and
closing, by the first packet engine, the first virtual connection, responsive to the determination that the connection timer for the first virtual connection has expired.

7. The method of claim 1, further comprising:
determining, by the first packet engine, that a transfer timer has expired; and
closing, by the first packet engine, any remaining virtual connections, responsive to the determination that the transfer timer has expired.

8. A method, comprising:
detecting, by a first packet engine of a device via a memory region shared with a second packet engine of the device, an identification of instantiation of the second packet engine written to the shared memory region by the second packet engine;
writing, by the first packet engine to the memory region shared with the second packet engine, connection information of existing connections of the first packet engine, responsive to detection of the identification of instantiation of the second packet engine;
receiving, by the first packet engine, a first packet provided to each of the first packet engine and the second packet engine;
determining, by the first packet engine, that the first packet is associated with a new connection; and
dropping, by the first packet engine, the first packet responsive to the determination that the first packet is associated with the new connection.

9. The method of claim 8, further comprising:
receiving, by the first packet engine, a second packet provided to each of the first packet engine and the second packet engine;
determining, by the first packet engine, that the second packet is associated with an existing connection; and
processing, by the first packet engine, the second packet responsive to the determination that the second packet is associated with the existing connection.

10. The method of claim 9, wherein the second packet is dropped by the second packet engine, responsive to the determination that the second packet is associated with the existing connection.

11. The method of claim 8, further comprising:
determining, by the first packet engine, that a connection timer for an existing first connection has expired; and
closing, by the first packet engine, the first connection, responsive to the determination that the connection timer for the first connection has expired.

12. The method of claim 8, further comprising:
determining, by the first packet engine, that a transfer timer has expired; and
closing, by the first packet engine, any remaining connections, responsive to the determination that the transfer timer has expired.

13. The method of claim 12, further comprising transmitting, by the first packet engine to a management service, an identification of completion of transfer to the second packet engine.

14. A system, comprising:
one or more processors executing a first packet engine and a second packet engine, each of the first packet engine and the second packet engine receiving a copy of received network data; and
a memory device comprising a memory region shared by the first packet engine and the second packet engine;
wherein the first packet engine is configured to take over processing of network data from the second packet engine by:
reading, from the memory region shared with the second packet engine of the device, connection information of existing connections of the second packet engine written to the shared memory region by the second packet engine,
establishing one or more virtual connections according to the connection information of existing connections of the second packet engine, each virtual connection corresponding to an existing connection of the second packet engine,
dropping packets of received network data associated with each virtual connection, processing packets of received network data associated with new connections, and closing each virtual connection responsive to expiration of a connection timer or a transfer timer of the first packet engine.

15. The system of claim 14, wherein the second packet engine is configured to:

write connection information of existing connections to the shared memory region, responsive to identification of instantiation of the first packet engine.

16. The system of claim 15, wherein the first packet engine is further configured to write, to the shared memory region, the identification of instantiation of the first packet engine.

17. The system of claim 14, wherein the second packet engine is configured to:

process packets of received network data associated with each existing connection corresponding to a virtual connection; and drop packets of received network data associated with new connections.

18. The system of claim 14, wherein the second packet engine is configured to close each existing connection responsive to expiration of a connection timer or a transfer timer of the second packet engine.

19. The system of claim 14, wherein each virtual connection established by the first packet engine has an identical port to a corresponding existing connection of the second packet engine.

20. The system of claim 14, wherein the first packet engine is further configured to notify a management service of completion of taking over processing of network data, responsive to closing all of the virtual connections.

* * * * *